(12) United States Patent
Odagawa et al.

(10) Patent No.: US 8,451,191 B2
(45) Date of Patent: May 28, 2013

(54) DISPLAY SYSTEM, DISPLAY METHOD, INFORMATION PROCESSING APPARATUS, AND COMPUTER-READABLE STORAGE MEDIUM

(75) Inventors: Masayuki Odagawa, Yokohama (JP); Akihiro Takamura, Fuchu (JP); Tetsurou Kitashou, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 898 days.

(21) Appl. No.: 12/502,047

(22) Filed: Jul. 13, 2009

(65) Prior Publication Data

US 2010/0019989 A1    Jan. 28, 2010

(30) Foreign Application Priority Data

Jul. 22, 2008  (JP) ................................ 2008-189039
Jul. 22, 2008  (JP) ................................ 2008-189042
Jul. 29, 2008  (JP) ................................ 2008-195303

(51) Int. Cl.
*G09G 5/00* (2006.01)
(52) U.S. Cl.
USPC ........................................................ 345/1.1
(58) Field of Classification Search
None
See application file for complete search history.

(56) References Cited

U.S. PATENT DOCUMENTS

| 4,783,648 | A | * | 11/1988 | Homma et al. | 715/794 |
| 4,890,257 | A | * | 12/1989 | Anthias et al. | 715/807 |
| 5,121,478 | A | * | 6/1992 | Rao | 715/804 |
| 5,877,762 | A | * | 3/1999 | Young | 715/803 |
| 6,204,847 | B1 | * | 3/2001 | Wright | 715/804 |
| 2005/0168399 | A1 | * | 8/2005 | Palmquist | 345/1.1 |

FOREIGN PATENT DOCUMENTS

| JP | 04-140990 |   | 5/1992 |
| JP | 09-081475 | A | 3/1997 |
| JP | 11-038953 | A | 2/1999 |
| JP | 2005-173291 | A | 6/2005 |
| JP | 2007-060388 | A | 3/2007 |
| WO | 2007/135776 | A1 | 11/2007 |

OTHER PUBLICATIONS

The above references were cited in a Dec. 25, 2012 Japanese Office Action, which is enclosed without an English Translation, that issued in Japanese Patent Application No. 2008-189042.

* cited by examiner

*Primary Examiner* — Joseph Haley
*Assistant Examiner* — Nicholas Lee
(74) *Attorney, Agent, or Firm* — Cowan, Liebowitz & Latman, P.C.

(57) ABSTRACT

In a display system which includes a plurality of space management units which are hierarchically connected, and each of which manages a predetermined space region as a management space region, a content management unit which manages one or a plurality of contents, and a plurality of display units which display information on display regions. Wherein each of the plurality of display units displays a content arranged in a subspace corresponding to a self display region in the management space region.

5 Claims, 21 Drawing Sheets

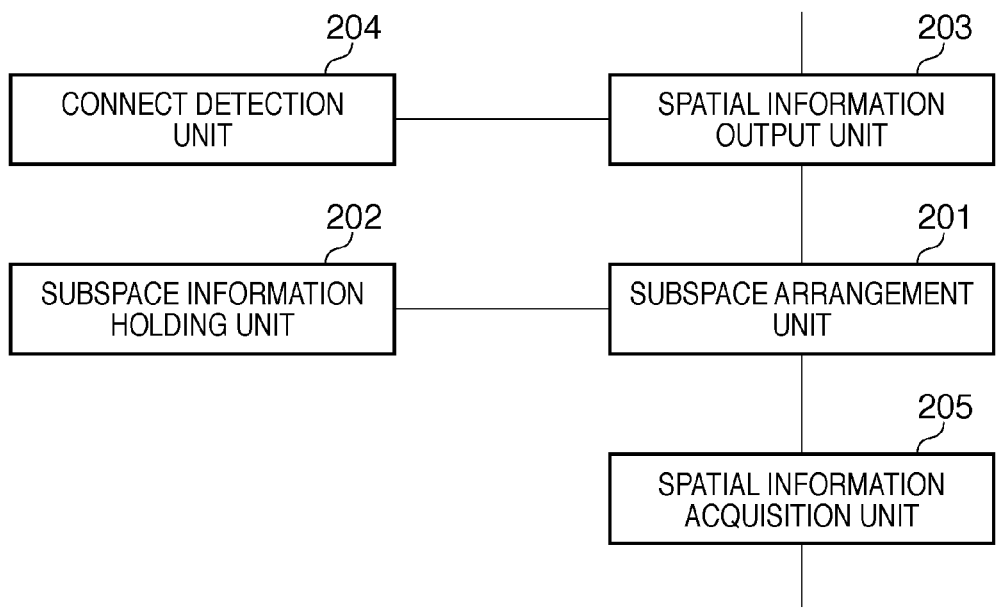

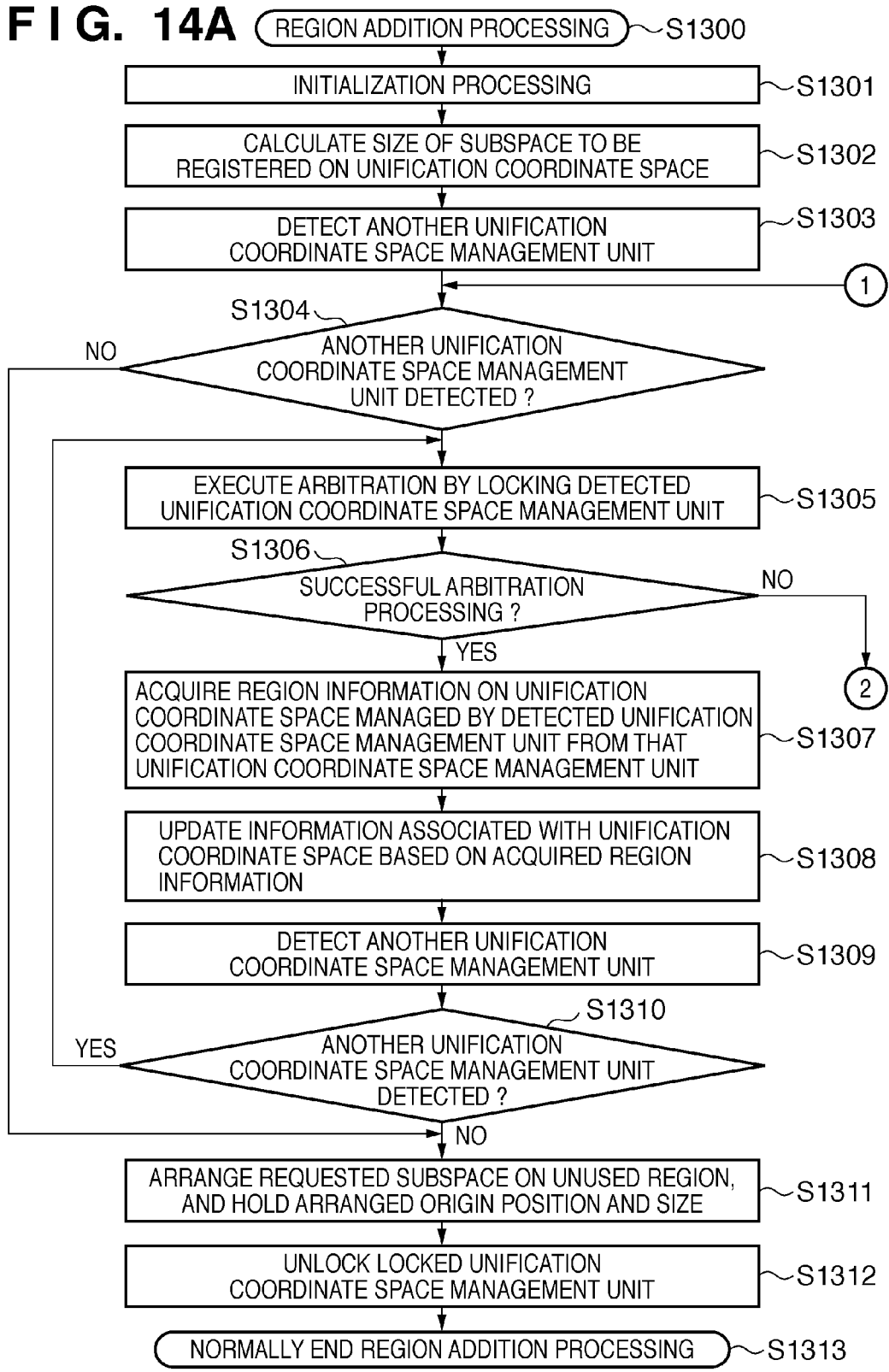

F I G. 14B
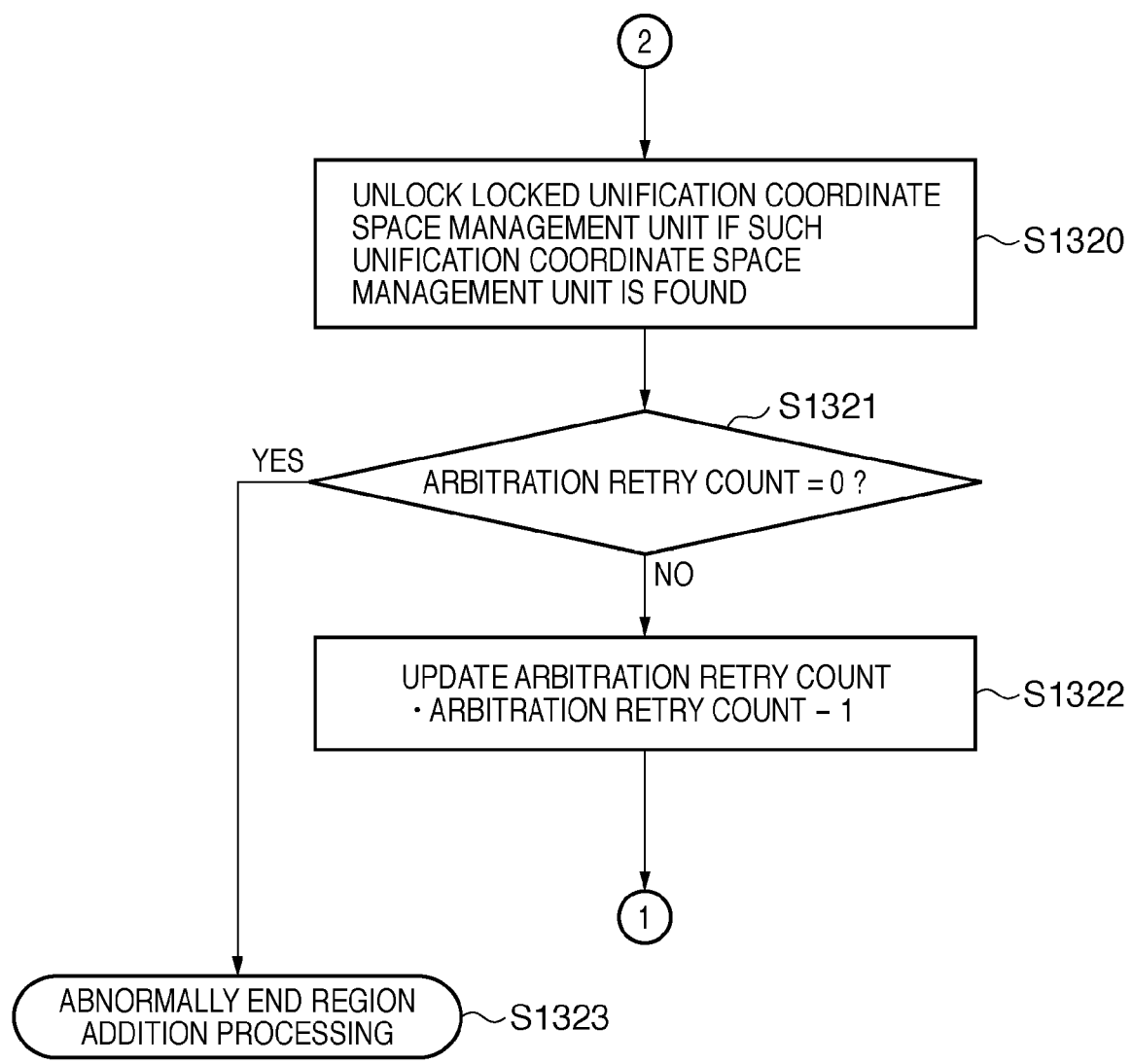

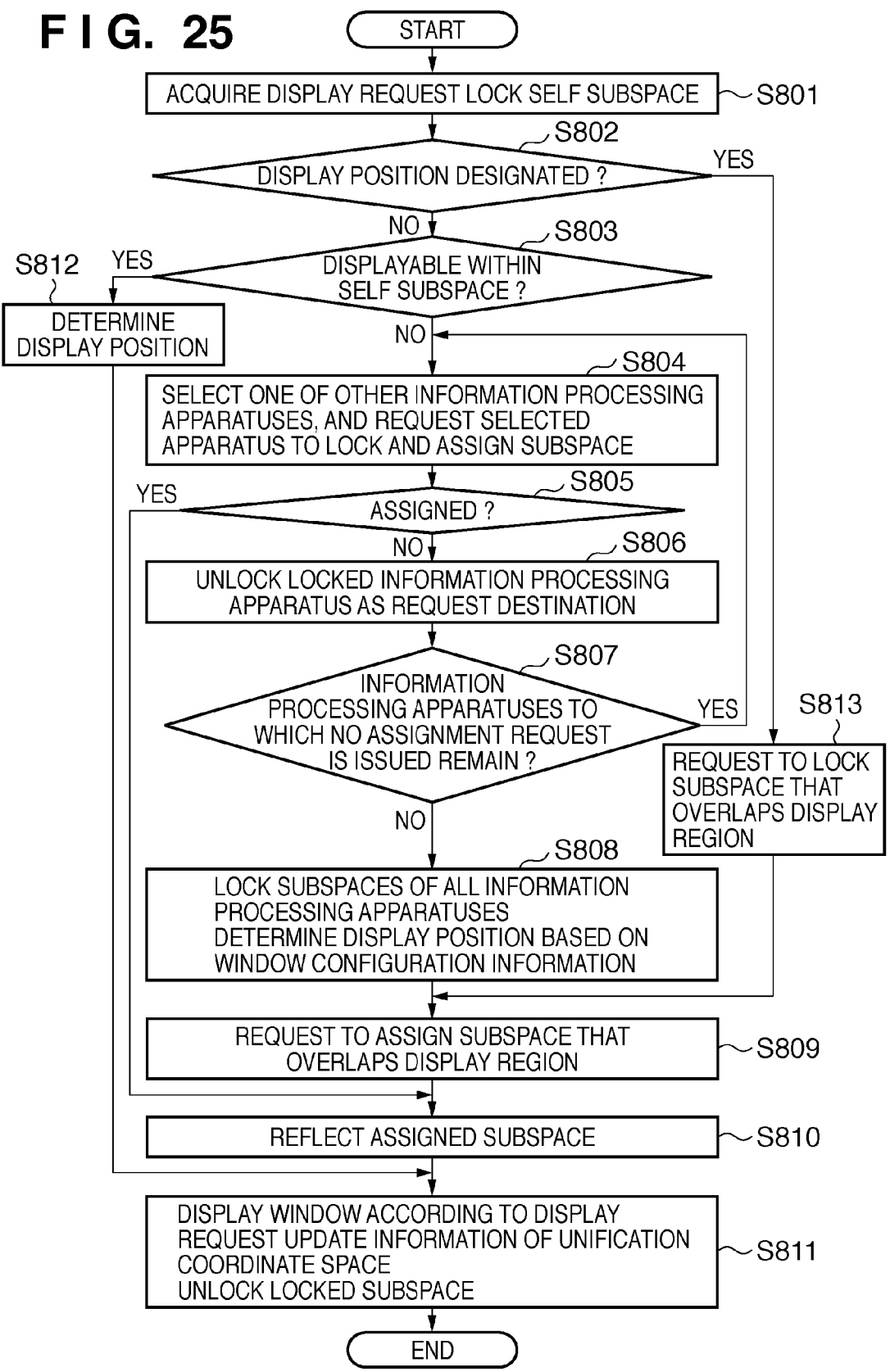

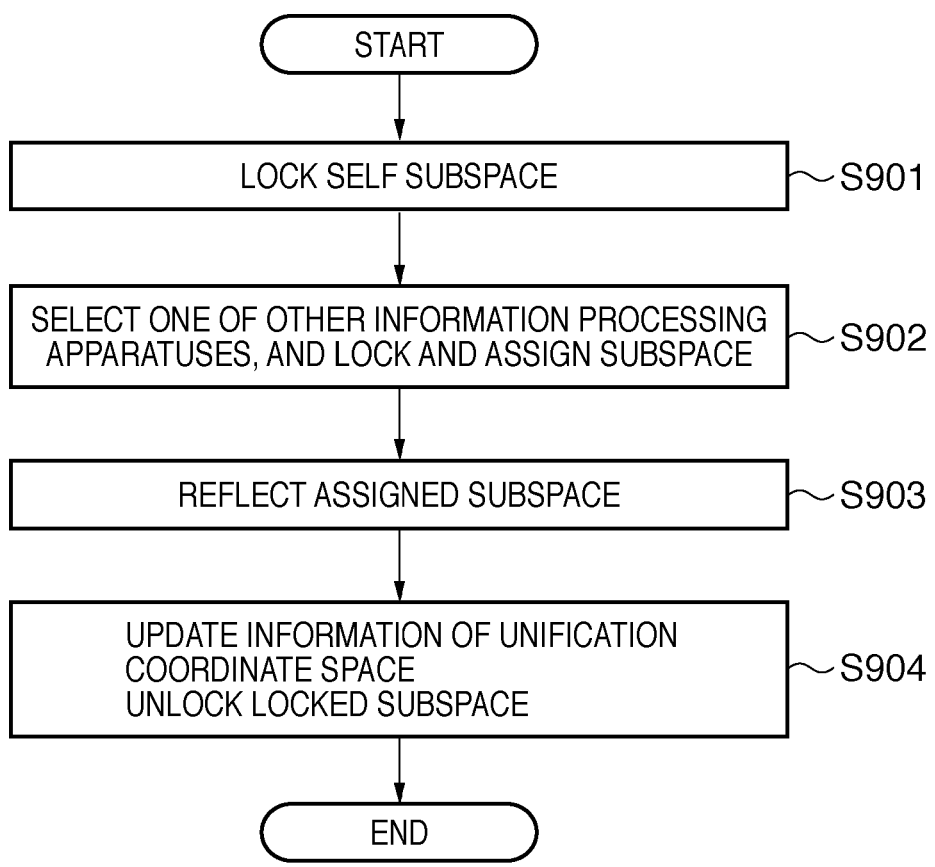

DISPLAY SYSTEM, DISPLAY METHOD, INFORMATION PROCESSING APPARATUS, AND COMPUTER-READABLE STORAGE MEDIUM

BACKGROUND OF THE INVENTION

1. Field of the Invention

The present invention relates to a display system which displays various kinds of information using a plurality of display devices, a display method, an information processing apparatus, and a computer-readable storage medium.

2. Description of the Related Art

A system which allows members at remote places to make visual and audible communications with each other using communication units is known. As such system, for example, a video conference system is known. The video conference system configures a pseudo conference room by presenting references used in a conference on display units at remote places and displaying video images of conference partners using video cameras.

In association with such video conference system, a technique disclosed in Japanese Patent Laid-Open No. 4-140990 is known. This system includes a plurality of member terminals each having a video phone, and one host terminal connected to these plurality of member terminals, and divisionally displays images of attendees at the respective member terminals on one screen upon holding a conference.

Also, a system which allows all member terminals to exchange video images with each other and to share a common screen without setting any host terminal is known. In this system, when a certain member terminal displays a new window or assures a region to change the display position or size of an existing window, it has to make adjustment with all other member terminals. For example, all member terminals have to wait for processing of other terminals and are inhibited from, for example, assuring a region before all terminals similarly assure regions and display windows. This is to avoid inconsistent display results.

These related arts suffer the following problems.

Since a plurality of member terminals are connected to one host terminal, transactions are concentrated on the host terminal, thus causing bottlenecks. As a result, it is difficult to increase the number of member terminals and display units that can attend the conference. For example, when a plurality of video conferences are held at the same time, it is difficult to unify them into a single conference.

In the method in which member terminals exchange video images with each other without setting any host terminal, a communication time and processing time required to assure a window display region increase with increasing number of member terminals. For this reason, it becomes difficult to efficiency conduct a conference.

SUMMARY OF THE INVENTION

The present invention provides a display system which decentrally executes processes associated with display processes of various kinds of information using a plurality of display devices, a display method, an information processing apparatus, and a computer-readable storage medium.

According to a first aspect of the present invention there is provided a display system comprising: a plurality of space management units configured to manage a predetermined space region as a management space region, the plurality of space management units being hierarchically connected; a content management unit configured to manage one or a plurality of contents; and a plurality of display units configured to display various kinds of information on display regions, each of the plurality of space management units comprising: a first acquisition unit configured to acquire, when the display unit is connected on a lower order side of itself, information including a size of a display region of the display unit from the display unit as spatial information; a second acquisition unit configured to acquire, when another space management unit is connected on the lower order side of itself, information including a size of a management space region of the other space management unit from the other space management unit as spatial information; an arrangement unit configured to arrange the spatial information acquired by one of the first acquisition unit and the second acquisition unit as a subspace in a management space region managed by itself; and an output unit configured to output information including a size of the management space region to another space management unit connected on an upper order side of itself, and the content management unit comprising: a management space region acquisition unit configured to acquire a management space region managed by the space management unit from any of the space management units; and a content arrangement unit configured to arrange a content in the management space region acquired by the management space region acquisition unit, wherein each of the plurality of display units displays a content arranged in a subspace corresponding to a self display region in the management space region.

According to a second aspect of the present invention there is provided a display method for a display system comprising a plurality of space management units configured to manage a predetermined space region as a management space region, the plurality of space management units being hierarchically connected, a content management unit configured to manage one or a plurality of contents, and a plurality of display units configured to display various kinds of information on display regions, wherein each of the plurality of space management units executes processes including: acquiring, when the display unit is connected on a lower order side of itself, information including a size of a display region of the display unit from the display unit as spatial information; acquiring, when another space management unit is connected on the lower order side of itself, information including a size of a management space region of the other space management unit from the other space management unit as spatial information; arranging the spatial information acquired in one of the acquiring the information including the size of the display region of the display unit and the acquiring the information including the size of the management space region of the other space management unit, as a subspace in a management space region managed by itself; and outputting information including a size of the management space region to another space management unit connected on an upper order side of itself, the content management unit executes processes including: acquiring a management space region managed by the space management unit from any of the space management units; and arranging a content in the management space region acquired in the acquiring the management space region, and each of the plurality of display units displays a content arranged in a subspace corresponding to a self display region in the management space region.

According to a third aspect of the present invention there is provided a display system comprising: a plurality of unification coordinate space management units configured to manage a unification coordinate space; and one or a plurality of display units arranged in correspondence with each of the unification coordinate space management units, the unification coordinate space management unit comprising: a detection unit configured to detect another unification coordinate space management unit; an acquisition unit configured to acquire, when the detection unit detects the other unification coordinate space management unit, region information associated with a region on the unification coordinate space managed by the other unification coordinate space management unit; and an arrangement unit configured to arrange a region corresponding to a display region of the display unit arranged in correspondence with the unification coordinate space management unit as a subspace on the unification coordinate space, based on the region information acquired by the acquisition unit.

According to a fourth aspect of the present invention there is provided a display method for a display system comprising a plurality of unification coordinate space management units configured to manage a unification coordinate space, and one or a plurality of display units arranged in correspondence with each of the unification coordinate space management units, wherein the unification coordinate space management unit executes processes including: detecting another unification coordinate space management unit; acquiring, when the other unification coordinate space management unit is detected, region information associated with a region on the unification coordinate space managed by the other unification coordinate space management unit; and arranging a region corresponding to a display region of the display unit arranged in correspondence with the unification coordinate space management unit as a subspace on the unification coordinate space, based on the region information acquired in the acquiring, and the display unit displays a content arranged in a region corresponding to a display region of itself arranged on the unification coordinate space.

According to a fifth aspect of the present invention there is provided a display system that shares a unification coordinate space and includes a plurality of information processing apparatuses for displaying windows on the unification coordinate space, each of the information processing apparatuses comprising: a subspace management unit configured to manage a partial region of the unification coordinate space as a subspace possessed by itself; an acquisition unit configured to acquire a display request of a window from a user; a control unit configured to determine a display region of the window designated by the display request within the subspace which is managed by the subspace management unit and is possessed by itself; and a display unit configured to display the window designated by the display request on the display region, wherein subspaces possessed by the plurality of information processing apparatuses do not overlap each other.

According to a sixth aspect of the present invention there is provided an information processing apparatus included in a display system which shares a unification coordinate space and displays a window on the unification coordinate space, comprising: a subspace management unit configured to manage a partial region of the unification coordinate space as a subspace possessed by itself; an acquisition unit configured to acquire a display request of a window from a user; a control unit configured to determine a display region of the window designated by the display request within the subspace which is managed by the subspace management unit and is possessed by itself; and a display unit configured to display the window designated by the display request on the display region, wherein the control unit allocates the subspace so as not to overlap subspaces possessed by a plurality of information processing apparatuses included in the display system.

According to a seventh aspect of the present invention there is provided a display method by an information processing apparatus included in a display system which shares a unification coordinate space and displays a window on the unification coordinate space, comprising: managing a partial region of the unification coordinate space as a subspace possessed by itself; acquiring a display request of a window from a user; determining a display region of the window designated by the display request within the subspace which is managed in the managing and is possessed by itself; and displaying the window designated by the display request on the display region, wherein in the determining, the subspace is allocated so as not to overlap subspaces possessed by a plurality of information processing apparatuses included in the display system.

According to a eighth aspect of the present invention there is provided a computer-readable storage medium storing a computer program for making a computer function as the above described information processing apparatus.

Further features of the present invention will become apparent from the following description of exemplary embodiments with reference to the attached drawings.

BRIEF DESCRIPTION OF THE DRAWINGS

FIG. 2 is a block diagram showing an example of the functional arrangement in a subspace management unit 102 shown in FIG. 1;

FIG. 3 is a view showing an example of the data format of subspace information held by a subspace information holding unit 202 shown in FIG. 2;

FIGS. 14A and 14B are first flowcharts showing an example of the operation of the display system shown in FIG. 13;

FIG. 25 is a flowchart showing an example of the operation of the information processing apparatus according to the third embodiment; and FIG. 26 is a flowchart showing an example of the operation of the information processing apparatus according to the third embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
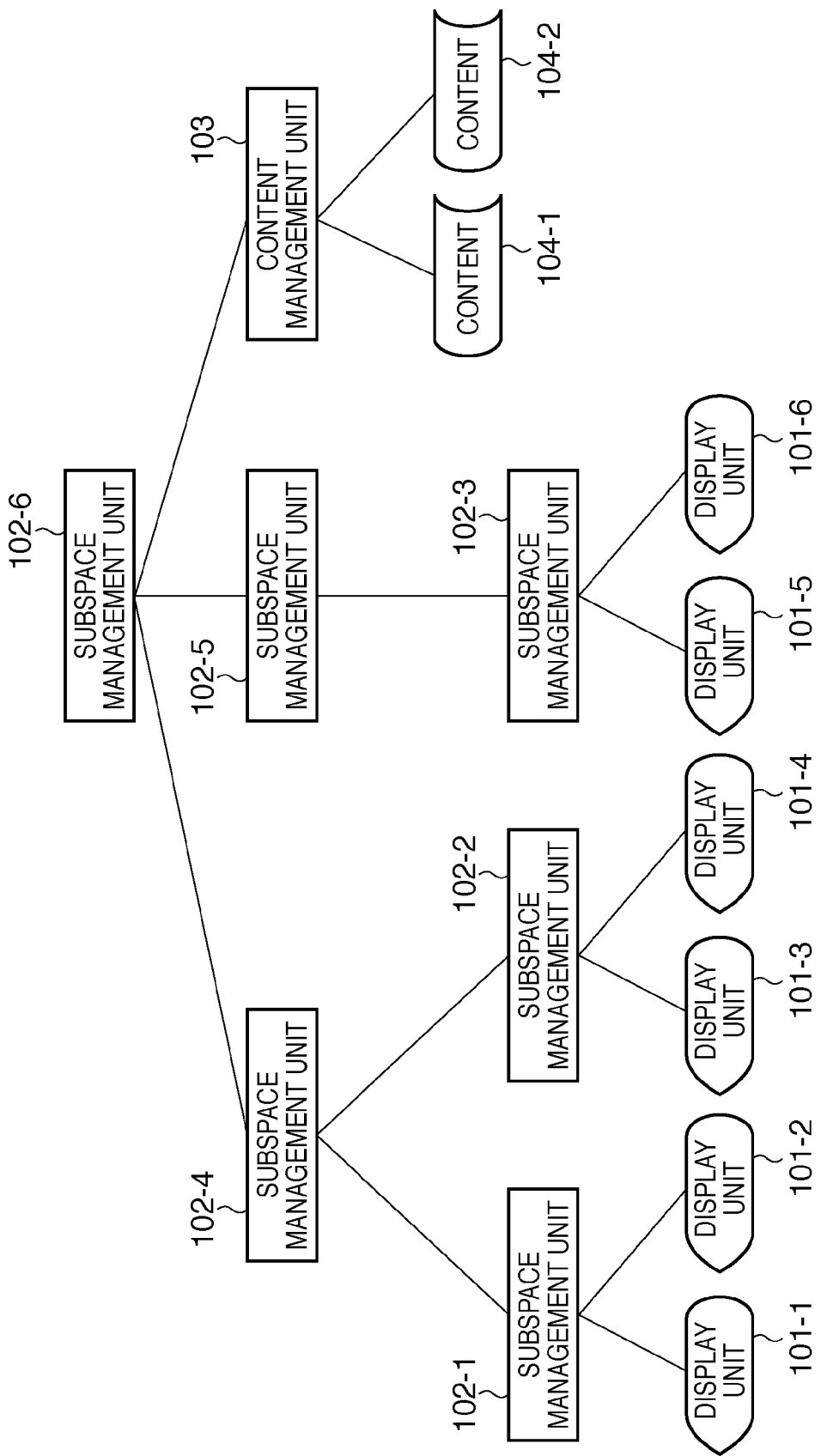
FIG. 1 is a block diagram showing an example of the arrangement of a display system according to an embodiment of the present invention.

FIG. 1 is a block diagram showing an example of the arrangement of a display system according to an embodiment of the present invention.

The display system includes one or a plurality of computers. Each computer includes, for example, a main control unit such as a CPU, and a storage unit such as a ROM (Read Only Memory) and RAM (Random Access Memory). The computer may also include a communication unit such as a network card, and input and output units such as a keyboard and a display or touch panel. Note that these units are connected via a bus and the like, and are controlled when the main control unit executes programs stored in the storage unit.

The display system includes, as a functional arrangement, display units 101, that is, 101-1 to 101-6, subspace management units 102, that is, 102-1 to 102-6, and content management unit 103. In case of FIG. 1, the plurality of display units 101 and the plurality of subspace management units 102 are connected.

Each display unit 101 displays various kinds of information (for example, video images) such as still images and moving images on a display region (screen). Each display unit 101 is connected to a corresponding one of the subspace management units 102. The display unit 101 outputs spatial information (for example, the size of a displayable region on the display unit 101) to the subspace management unit 102. Note that the plurality of display units 101 are connected in FIG. 1, and they may have different performances such as displayable regions, resolutions, and color expressive powers.

The subspace management units 102 are hierarchically connected to have a tree structure. To each subspace management unit 102, a plurality of display units 101 and another subspace management unit 102 are connected. The subspace management unit 102 receives spatial information from the display units 101 and subspace management units 102 connected to itself (on the lower order side thereof). Note that the spatial information is information associated with a space region of each of the display units 101 and subspace management units 102, and includes at least a size.

FIG. 2 shows an example of the functional arrangement in the subspace management unit 102. The subspace management unit 102 includes, as the functional arrangement, a subspace arrangement unit 201, subspace information holding unit 202, spatial information output unit 203, connect detection unit 204, and spatial information acquisition unit 205.

The spatial information acquisition unit 205 acquires spatial information input from the display units 101 and subspace management units 102 connected to itself (on the lower order side thereof). That is, the spatial information acquisition unit 102 acquires information including a size of a display region from each display unit 101 as spatial information (first acquisition), and information including a size of a management space region from each subspace management unit 102 as spatial information (second acquisition). For example, the subspace management unit 102-4 receives and acquires pieces of spatial information input from the subspace management units 102-1 and 102-2.

The subspace arrangement unit 201 arranges a subspace based on the input spatial information. Hence, the subspace management unit 102 configures a management space region managed by itself.

The subspace information holding unit 202 holds information (to be referred to as subspace information hereinafter) associated with one or a plurality of subspaces arranged in the management space region by the subspace arrangement unit 201. FIG. 3 shows an example of the data format of this subspace information.

The subspace information is held in correspondence with each subspace arranged in the management space region managed by the subspace management unit 102. The subspace information holds a space region ID 601, space region coordinates 602, space region X size 603, and space region Y size 604 in correspondence with each subspace. The space region ID 601 indicates an identifier used to identify each subspace. The space region coordinates 602 indicate the arrangement coordinates of each subspace. The space region X size 603 indicates the size of each subspace in the X-direction, and the space region Y size 604 indicates the size of that subspace in the Y-direction. The space region X size 603 and space region Y size 604 are held based on spatial information input to the subspace management unit 102.

The connect detection unit 204 detects whether or not another subspace management unit 102 is connected to itself (subspace management unit 102). This detection is made for the subspace management unit 102 located on the upper order of itself. For example, the subspace management unit 102-4 detects the subspace management unit 102-6.

The spatial information output unit 203 calculates a size of the management space region managed by itself (subspace management unit 102), and outputs the calculation result as new spatial information. The spatial information output unit 203 outputs the spatial information to the subspace management unit 102 located on the upper order side of itself. The spatial information is output based on the detection result of the connect detection unit 204. More specifically, when no subspace management unit 102 is connected, the spatial information is not output. For example, the subspace management unit 102-4 outputs spatial information to the subspace management unit 102-6, and the subspace management unit 102-6 does not output any spatial information.

Figure 4:
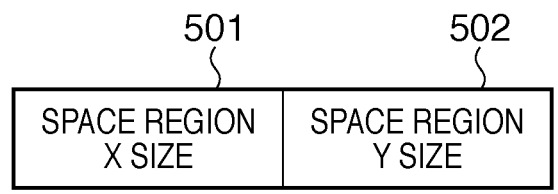
FIG. 4 is a view showing an example of spatial information output from a spatial information output unit 203 shown in FIG. 2.

FIG. 4 shows an example of the spatial information output from the spatial information output unit 203. The spatial information includes, for example, two fields. More specifically, the spatial information includes a space region X size 501 which indicates the size of the management space region managed by itself (subspace management unit 102) in the X-direction, and a space region Y size 502 which indicates the size of the management space region managed by itself in the Y-direction.

Figure 5:
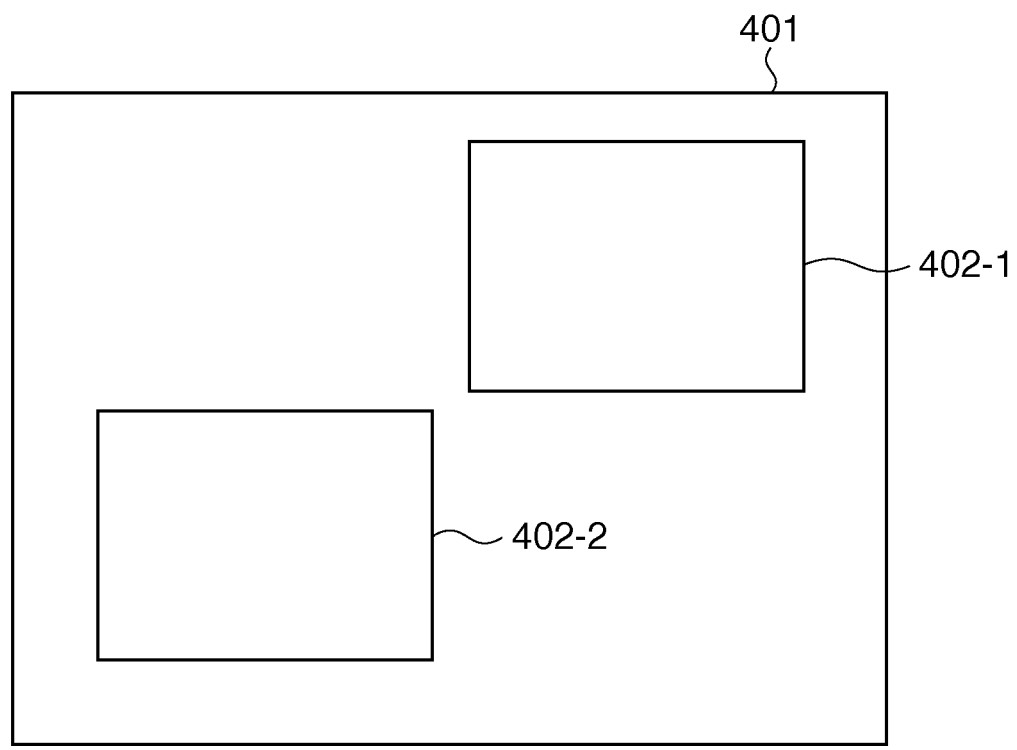
FIG. 5 is a view showing an example of a management space region managed by the subspace management unit 102 shown in FIG. 1.

FIG. 5 is a view showing an example of the management space region managed by the subspace management unit 102.

Note that subspaces 402 (402-1 and 402-2) are space regions, which are generated by the subspace management unit 102 based on spatial information input from the display unit 101 or another subspace management unit 102. The subspace management unit 102 configures a management space region 401 managed by itself (subspace management unit 102) by arranging one or a plurality of subspaces 402 using the subspace arrangement unit 201.

Figure 6:
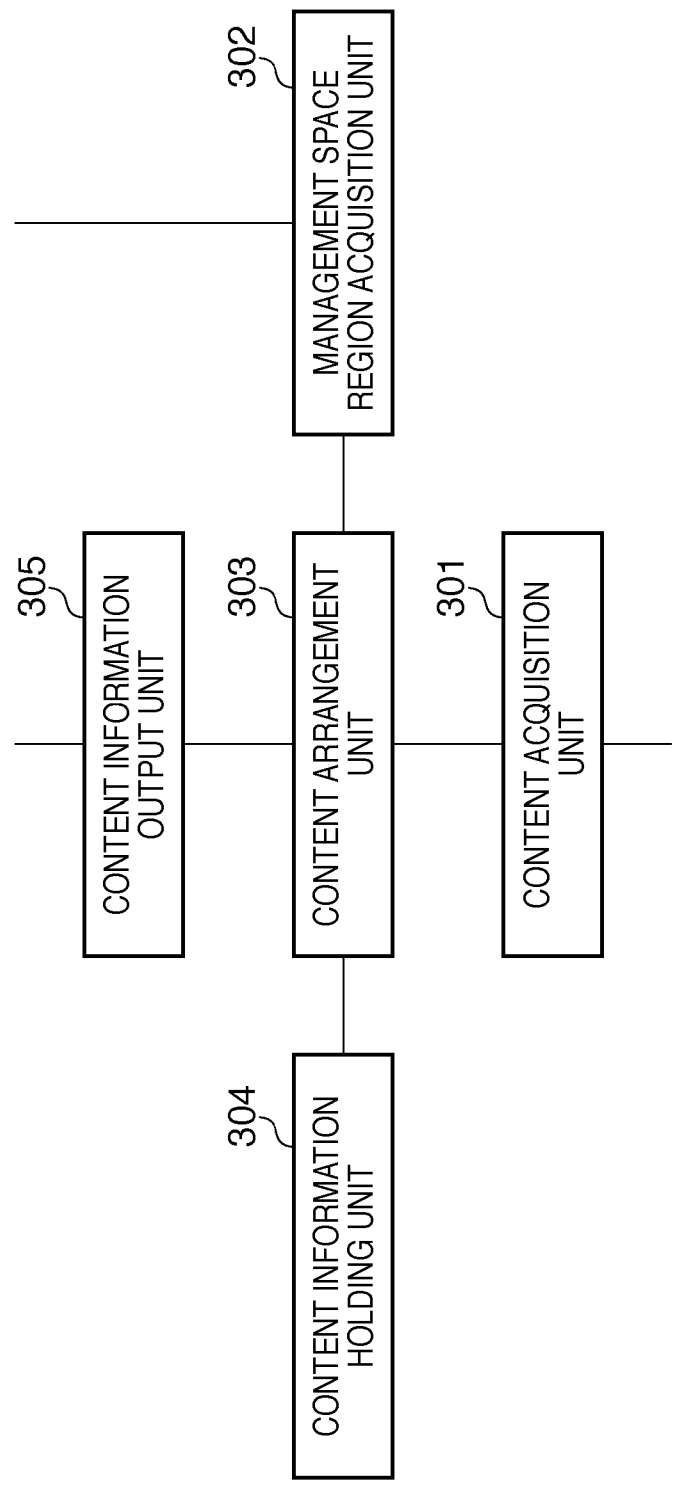
FIG. 6 is a block diagram showing an example of the functional arrangement of a content management unit 103 shown in FIG. 1.

Referring back to FIG. 1, the content management unit 103 arranges one or a plurality of contents 104 in a unification coordinate system. The content management unit 103 is logically connected to the subspace management unit 102. Note that the content is digital data including a wide variety of document (text), music, image, and video data. FIG. 6 shows an example of the functional arrangement in the content management unit 103. The content management unit 103 includes, as the functional arrangement, a content acquisition unit 301, management space region acquisition unit 302, content arrangement unit 303, content information holding unit 304, and content information output unit 305.

The content acquisition unit 301 acquires a content 104. Note that the content 104 to be acquired may be a content itself or may include other kinds of information.

The management space region acquisition unit 302 acquires a management space region managed by the subspace management unit 102 from that subspace management unit 102. Note that upon acquisition of the management space region, subspaces included in that management space region are also acquired.

The content arrangement unit 303 arranges a content in a management space region and, more specifically, in a subspace.

Figure 7:
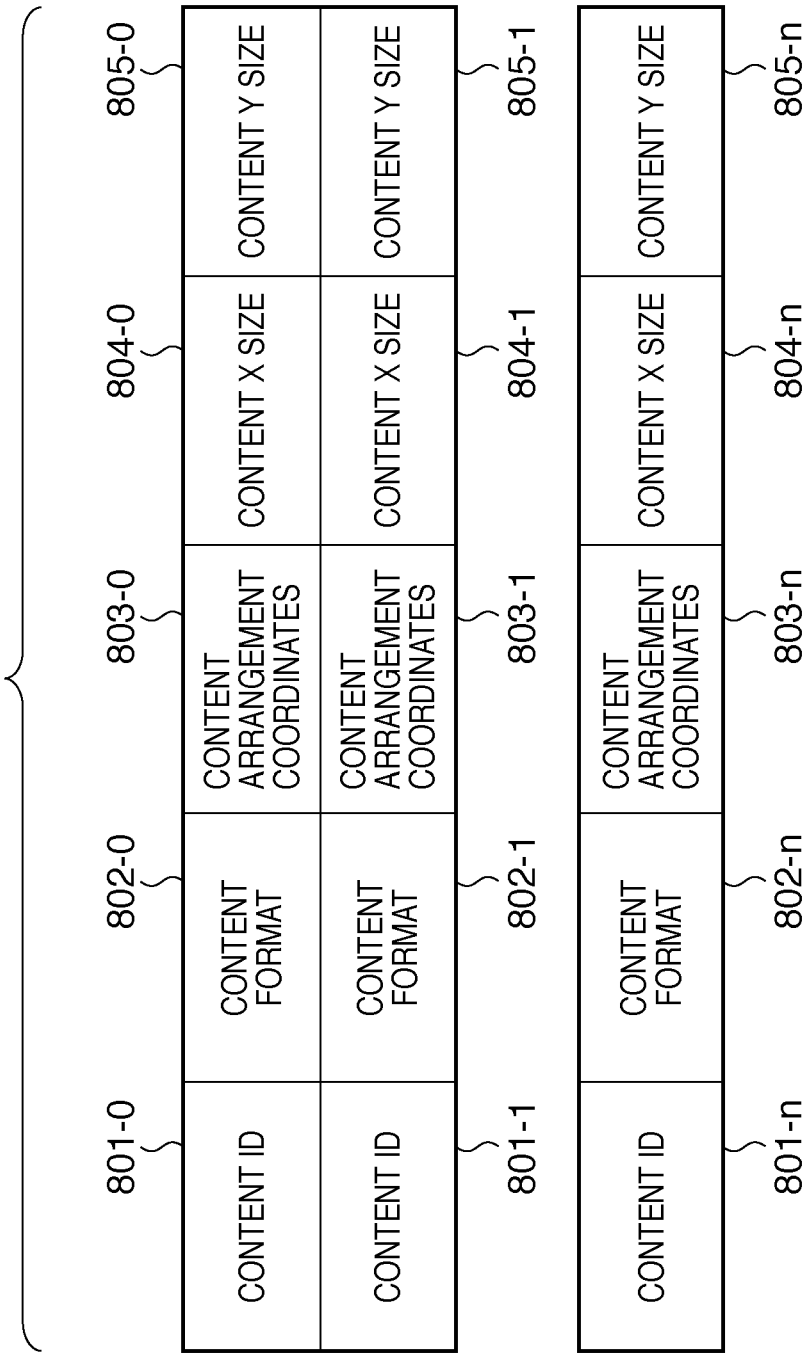
FIG. 7 is a view showing an example of the data format of content information held by a content information holding unit 304 shown in FIG. 6.

The content information holding unit 304 holds information associated with a content (to be referred to as content information hereinafter). FIG. 7 is a view showing an example of the data format of content information held by the content information holding unit 304. The content information is held in correspondence with each content. The content information holds a content ID 801, content format 802, content arrangement coordinates 803, content X size 804, and content Y size 805 in correspondence with each content. The content ID 801 indicates an identifier used to identify each content. The content format 802 indicates the data format of each content. The content arrangement coordinates 803 indicate the arrangement coordinates of each content. The content X size 804 indicates a spatial size of each content in the X-direction, and the content Y size 805 indicates a spatial size of that content in the Y-direction.

Figure 8:
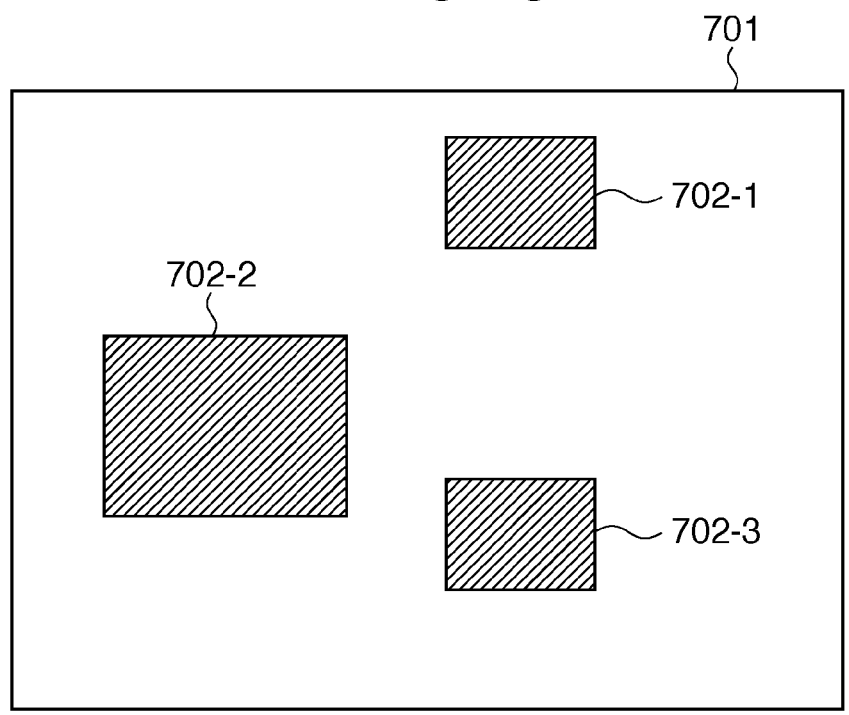
FIG. 8 is a view showing an example of contents 104 arranged in a management space region by a content arrangement unit 303 shown in FIG. 6.

FIG. 8 is a view showing an example of contents 104 arranged in the management space region by the content arrangement unit 303. A management space region 701 is a space region acquired by the management space region acquisition unit 302. Contents 702, that is, 702-1 to 702-3 are arranged by the content arrangement unit 303.

The content information output unit 305 outputs a content and its arrangement information. Each display unit 101 displays a content arranged in a subspace corresponding to itself based on information output from this content information output unit 305. For example, the subspace management unit 102 which receives a content and its arrangement information input from the content information output unit 305 provides these pieces of information to the subspace management unit 102 connected on its lower order side. By repeating this processing, the content and its arrangement information are input to the subspace management unit 102 located on a lowermost layer. The subspace management unit 102 located on the lowermost layer generates display information based on the input information, and outputs the display information to the display units 101. As a result, each display unit 101 displays the aforementioned content. Note that the display information may be input to each display unit 101 by other methods, and the input methods are not particularly limited. For example, a processing unit which generates display information based on information associated with the management space region held by the subspace management unit 102 and information output from the content information output unit 305 may be connected to achieve the aforementioned display processing.

Figure 9:
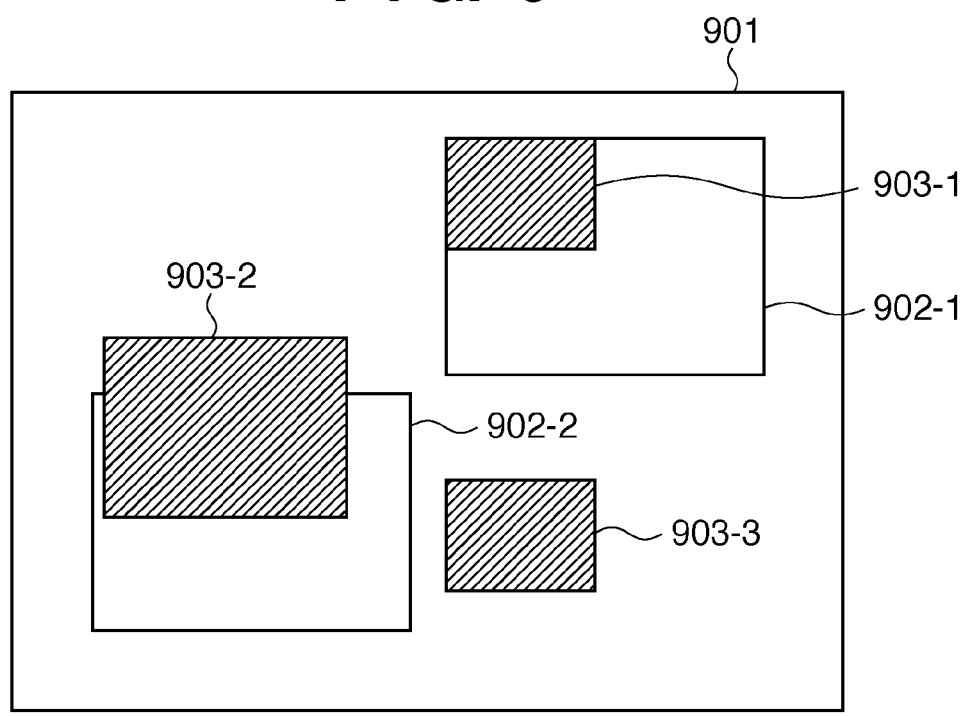
FIG. 9 is a view showing an example of a case in which the contents, which are arranged, as shown in FIG. 8, are mapped on the management space region shown in FIG. 5.

FIG. 9 is a view showing an example of a case in which the contents, which are arranged, as shown in FIG. 8, are mapped on the management space region shown in FIG. 5.

Each of subspaces 902, that is, 902-1 and 902-2 corresponds to a space region (display region or management space region) of the display unit 101 or subspace management unit 102 connected on the lower order side of the subspace management unit 102 which configures a management space region 901. Contents 903, that is, 903-1 to 903-3 are arranged on the management space region 901. An overlapping region between the subspace 902 and content 903 is output to, for example, the display unit 101. If the subspace 902-2 is a space region corresponding to the display unit 101-1, a part of the content 903-2 is displayed on the display unit 101-1.

Figure 10:
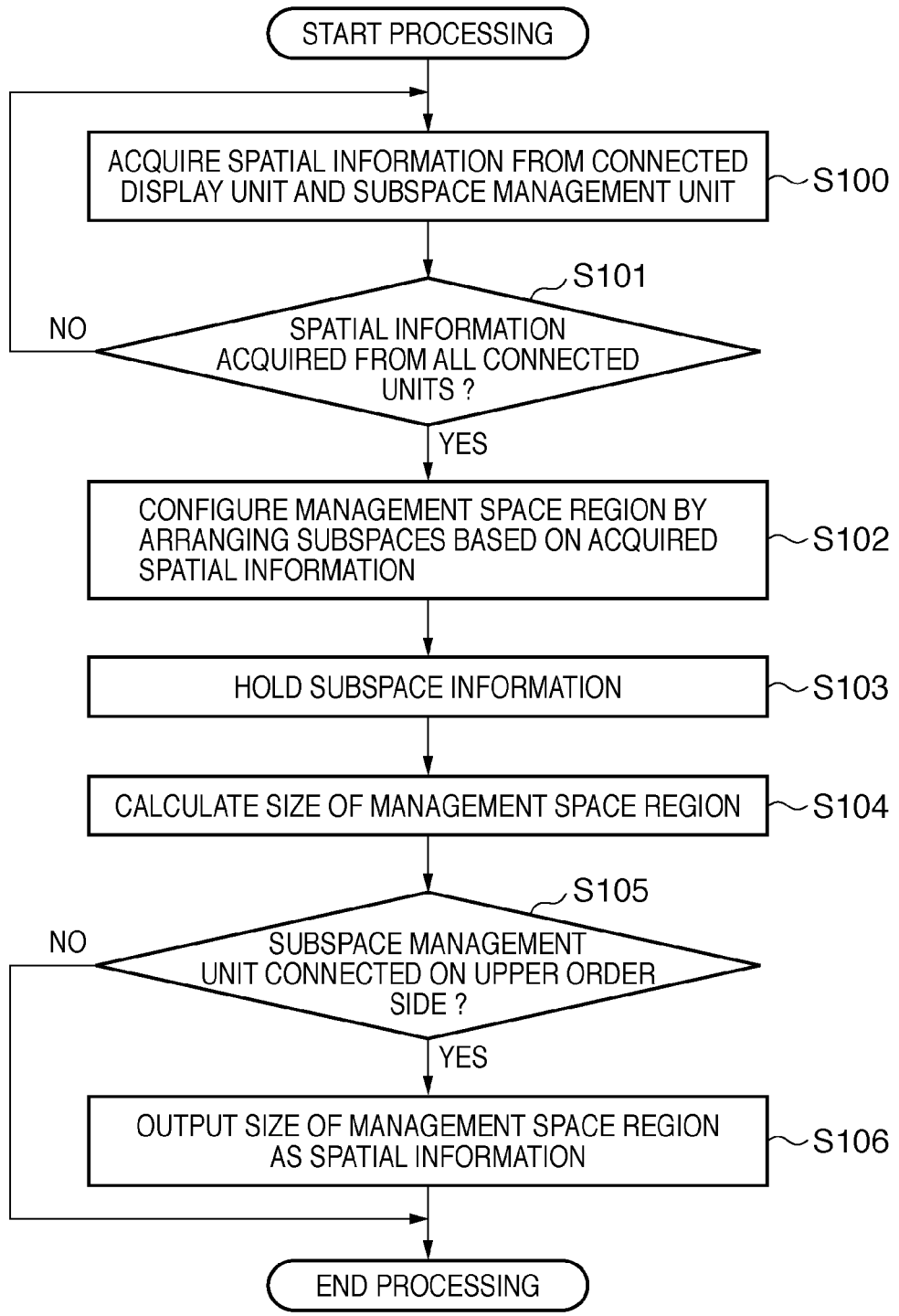
FIG. 10 is a first flowchart showing an example of the operation of the display system shown in FIG. 1.
Figure 11:
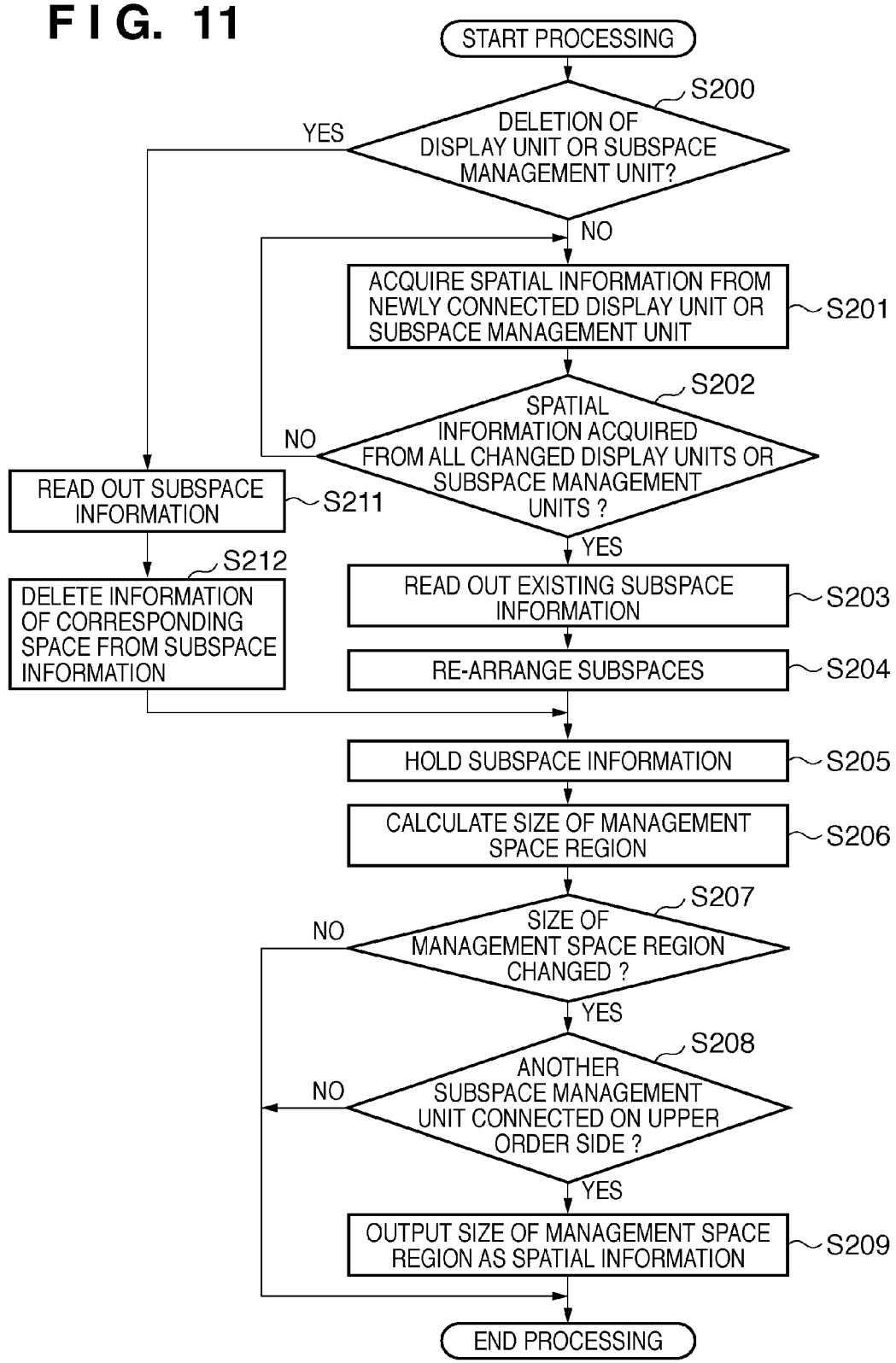
FIG. 11 is a second flowchart showing an example of the operation of the display system shown in FIG. 1.
Figure 12:
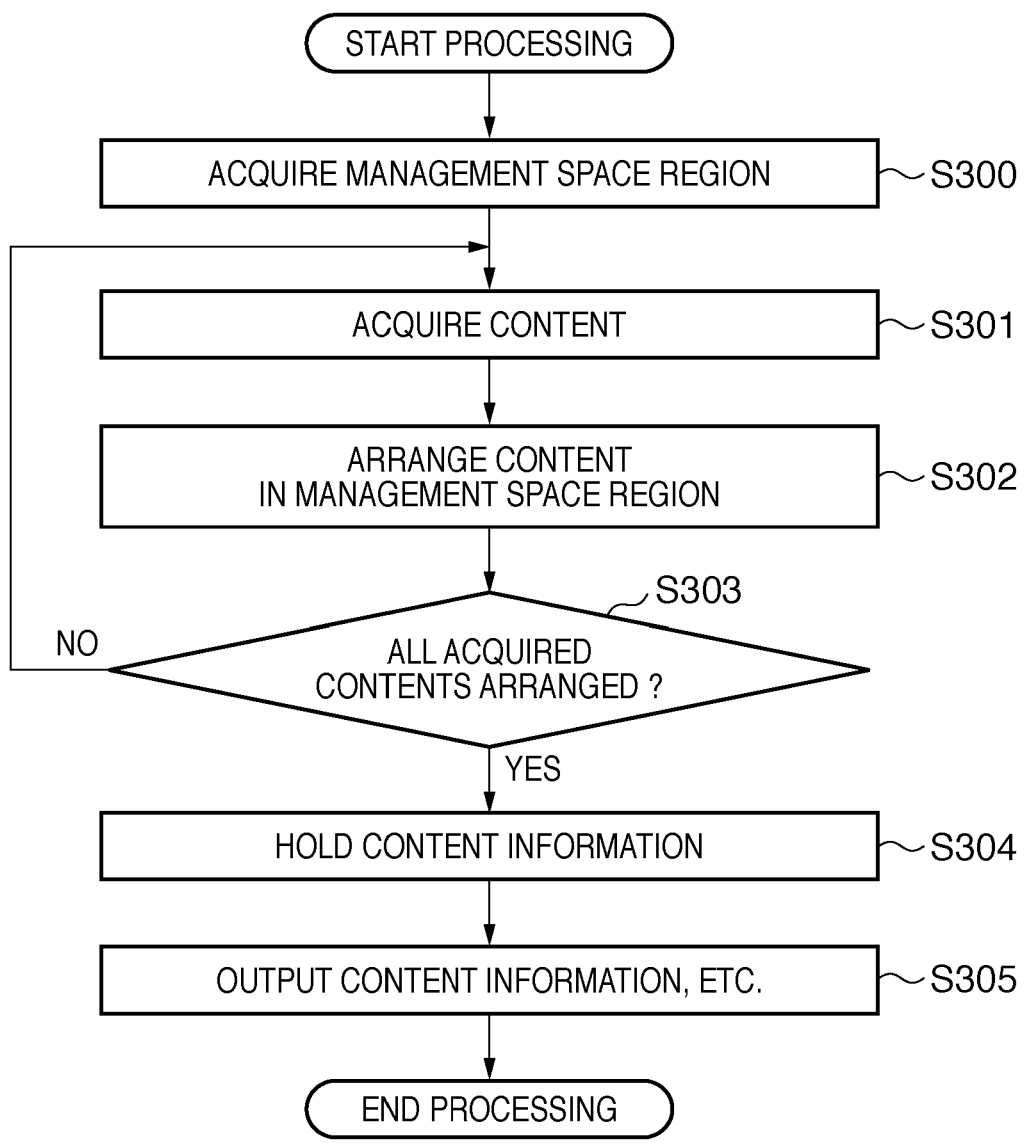
FIG. 12 is a third flowchart showing an example of the operation of the display system shown in FIG. 1.

An example of the operation in the display system shown in FIG. 1 will be described below with reference to FIGS. 10, 11, and 12. The operation of the subspace management unit 102 will be described first using FIG. 10. Note that a description of FIG. 10 will be given focused on the operation of arbitrary one subspace management unit 102. As shown in FIG. 1, the plurality of subspace management units 102 are hierarchically connected in the display system. That is, the operation of the display system is implemented when the plurality of hierarchically connected subspace management units 102 operate. For this reason, the operation of the display system of this embodiment will become obvious by explaining the operation of arbitrary one subspace management unit 102.

This processing starts, for example, when the subspace management unit 102 is started up (or it may start at the startup timing of the display system). When this processing starts, the subspace management unit 102 causes the spatial information acquisition unit 205 to acquire pieces of spatial information 501 and 502 from the display unit 101 or another subspace management unit 102 connected to itself (on the lower order side thereof) (S100). This process is repetitively executed to acquire spatial information from all the connected display units 101 and subspace management units 102 (NO in step S101).

Upon completion of acquisition of the spatial information, the subspace management unit 102 causes the subspace arrangement unit 201 to arrange subspaces based on the acquired spatial information. In this way, the subspace management unit 102 configures a management space region managed by itself (S102). The subspace management unit 102 causes s the subspace information holding unit 202 to hold arrangement information associated with one or a plurality of subspaces, that is, subspace information, in the data format described above using FIG. 3 (S103).

The subspace management unit 102 calculates a size of the management space region managed by itself (S104). Upon completion of this calculation, the subspace management unit 102 causes the connect detection unit 204 to detect whether or not another subspace management unit 102 is connected to itself (on the upper order side thereof) (S105). As a result, if no subspace management unit 102 is connected (NO in step S105), the subspace management unit 102 ends this processing. If another subspace management unit 102 is connected (YES in step S105), the subspace management unit 102 causes the spatial information output unit 203 to output spatial information (S106), and then ends this processing.

An example of the operation when the configuration of the management space region managed by the subspace management unit 102 is changed will be described below with reference to FIG. 11. Note that the configuration of the management space region is changed, for example, when a new display unit 101 is added to or the display unit 101 is deleted from the management space region managed by itself (subspace management unit 102) or the management space region managed by itself is changed. More specifically, this processing starts in response to a change in spatial information input from the display unit 101 or another subspace management unit 102.

When this processing starts, the subspace management unit 102 determines if the display unit 101 or another subspace management unit 102 connected to itself (on the lower order side thereof) is deleted. This determination process can be implemented by holding an input source of previously (e.g., immediately preceding) input spatial information, and by comparing that information.

As a result, if neither the display unit 101 nor the subspace management unit 102 is deleted (NO in step S200), the subspace management unit 102 determines that the display unit 101 or subspace management unit 102 is added or changed. Then, the subspace management unit 102 acquires spatial information from the display unit 101 or subspace management unit 102 which is newly connected, or the size of spatial information of which is changed (S201). The spatial information is repetitively acquired until acquisition of spatial information from all display units 101 or subspace management units 102 corresponding to the changed spatial information is completed (NO in step S202).

Upon completion of acquisition of all pieces of changed spatial information, the subspace management unit 102 reads out existing subspace information held in the subspace information holding unit 202 (S203). The subspace management unit 102 causes the subspace arrangement unit 201 to execute rearrangement processing of subspaces based on the readout subspace information and the changed spatial information acquired in step S201, and reconfigures the management space region managed by itself (S204). Then, the subspace management unit 102 causes the subspace information holding unit 202 to hold subspace information in the data format described above using FIG. 3 (S205).

The subspace management unit 102 calculates a size of the management space region managed by itself (S206). Upon completion of this calculation, the subspace management unit 102 determines whether or not the size of the management space region managed by itself has changed. If the size of the management space region is not changed (NO in step S207), the subspace management unit 102 ends this processing. If the size of the management space region is changed, the subspace management unit 102 causes the connect detection unit 204 to detect whether or not another subspace management unit 102 is connected to itself (on the upper order side thereof). As a result, if another subspace management unit 102 is not connected (NO in step S208), the subspace management unit 102 ends this processing. If another subspace management unit 102 is connected (YES in step S208), the subspace management unit 102 causes the spatial information output unit 203 to output information including the size of the management space region as spatial information (S209), and then ends this processing.

If it is determined in the process of step S200 that the display unit 101 or another subspace management unit 102 is deleted (YES in step S200), the subspace management unit 102 reads out subspace information held by the subspace information holding unit 202 (S211). The subspace management unit 102 deletes arrangement information of a subspace corresponding to the deleted display unit 101 or subspace management unit 102 from the readout subspace information (S212). Since the subsequent processes are the same as those described above, a repetitive description thereof will be avoided.

The arrangement processing of contents 104 by the content management unit 103 will be described below with reference to FIG. 12. This processing is executed after completion of the processing described using FIG. 10.

When this processing starts, the content management unit 103 causes the management space region acquisition unit 302 to acquire the management space region configured by the processing described above using FIG. 10 from the subspace management unit 102 (S300). The content management unit 103 causes the content acquisition unit 301 to selectively acquire any of contents from the plurality of contents 104 (S301). The content management unit 103 causes the content arrangement unit 303 to arrange the acquired content in the management space region acquired in step S300 (S302). The content management unit 103 repeats the processes of steps S301 and S302 until the arrangement processing of all acquired contents is completed (NO in step S303).

Upon completion of arrangement of contents (YES in step S303), the content management unit 103 causes the content information holding unit 304 to hold information associated with contents, that is, content information in the data format described using FIG. 7 (S304). The content management unit 103 causes the content information output unit 305 to output the contents and their arrangement information (S305), and then ends this processing. Although a description will not be given, when the arrangement of a content is changed or added, the content information output unit 305 outputs information which reflects that change or addition in correspondence with the change or addition.

As described above, according to this embodiment, the subspace management unit 102 manages a display space region of each display unit 101, and such subspace management units 102 are hierarchically connected to construct the system. For this reason, since the processes associated with display processes of various kinds of information using a plurality of display devices can be decentrally implemented (for example, by distributing them to a plurality of apparatuses), for example, a sharable unification coordinate system can be constructed without being restricted by hardware resources.

Hence, for example, in a conventional system, information is shared using physical communication lines. However, according to this embodiment, information can be shared by separating it from physical media. Also, for example, since the unification coordinate system is configured by the plurality of subspace management units 102, and shared display processes can be decentrally executed by these plurality of subspace management units 102, bottlenecks due to physical restrictions can be removed. For example, when a plurality of video conferences are held in a common coordinate system, the video conferences which are held at the same time can be constructed as a single video conference.

Second Embodiment

Figure 13:
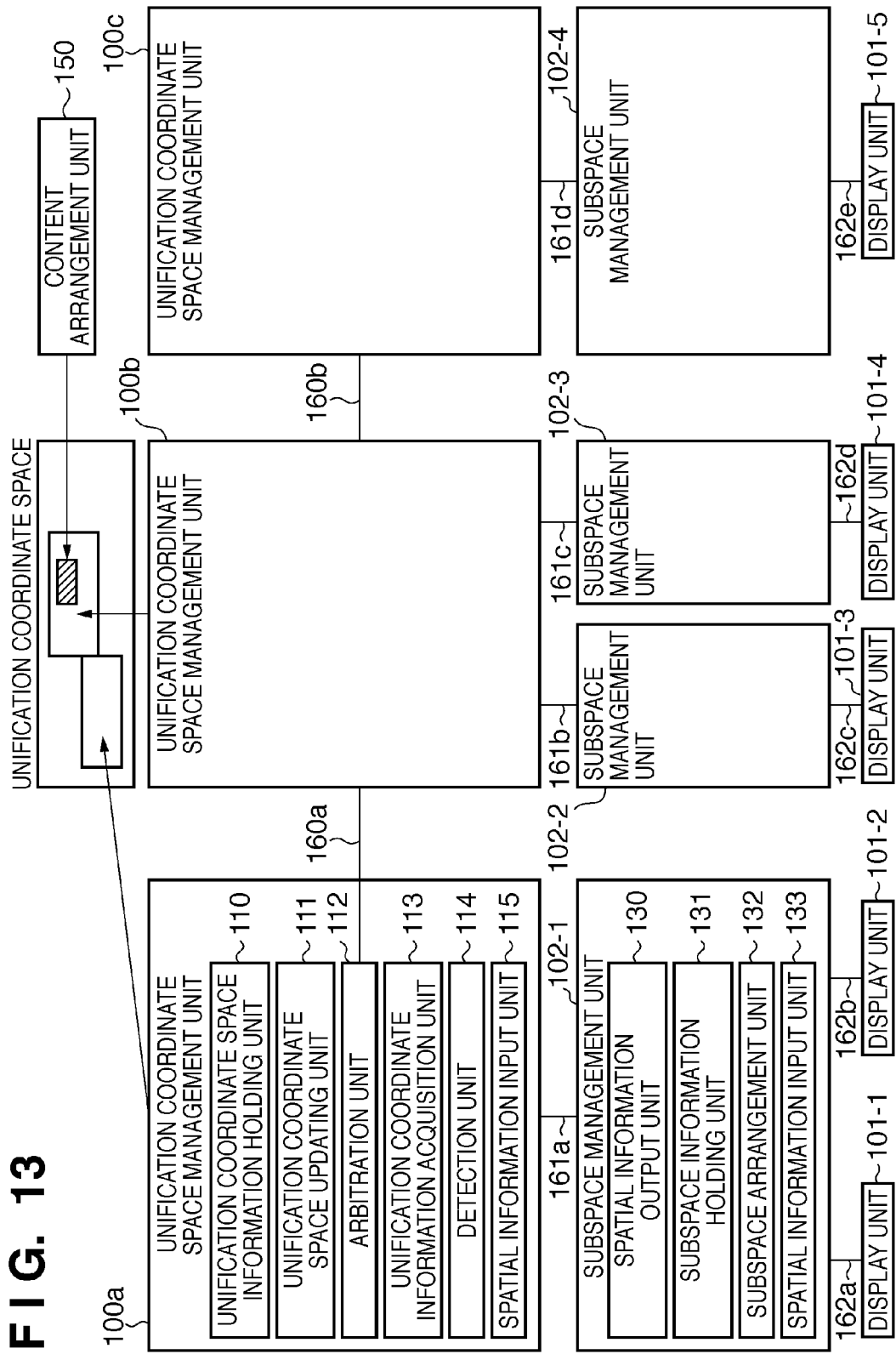
FIG. 13 is a block diagram showing an example of the arrangement of a display system according to the second embodiment.

FIG. 13 is a block diagram showing an example of the arrangement of a display system according to the second embodiment. Note that the same reference numerals denote processing units which implement the same functions as those in FIG. 1 used to describe the first embodiment, and a description thereof may often not be given.

The display system includes, as the functional arrangement, unification coordinate space management units 100, that is, 100*a* to 100*c*, subspace management units 102 (102-1 to 102-4), display units 101, that is, 101-1 to 101-5, and a content arrangement unit 150.

To each subspace management unit 102, one or a plurality of display units 101 are connected via a connection interface or connection interfaces 162, that is, 162*a* to 162*e*. The subspace management unit 102 receives spatial information from the display unit 101 connected to itself (on the lower order side thereof). The subspace management unit 102 generates and manages a subspace based on this spatial information. Note that the spatial information is information associated with a space region of the display unit 101, and includes at least a size.

Each unification coordinate space management unit 100 is connected to another unification coordinate space management unit 100 via a corresponding one of connection interfaces 160, that is, 160*a* or 160*b*, and is connected to one or a plurality of subspace management units 102 via a connection interface or connection interfaces 161, that is, 161*a* to 161*d*. The unification coordinate space management unit 100 acquires spatial information from the subspace management unit 102 connected on the lower order side of itself, and arranges it as a subspace on a unification coordinate space. The spatial information acquired from the subspace management unit 102 corresponds to a display region of the display unit 101 connected on the lower order side of itself. For example, the display units 101-1 and 101-2 are associated with the unification coordinate space management unit 100*a*, which receives pieces of spatial information corresponding to display regions of these display units 101-1 and 101-2 via the subspace management unit 102-2. In FIG. 13, the unification coordinate space management unit 100 and display unit 101 are connected via the subspace management unit 102. This is to reduce the processing load imposed on the unification coordinate space management unit 100. For this reason, for example, the unification coordinate space management unit 100 and display unit 101 may be directly connected. Also, for example, in order to further reduce the processing load, the subspace management units 102 may be hierarchically connected.

The content arrangement unit 150 arranges one or a plurality of contents in the unification coordinate space. After arrangement of the contents, the content arrangement unit 150 outputs the contents and their arrangement information to the unification coordinate space management units 100. Hence, each display unit 101 displays a content arranged within a range of a subspace (display region) corresponding to itself in the unification coordinate space. For example, this arrangement information and the like are supplied from each unification coordinate space management unit 100 to the subspace management unit 102, which generates display information based on the input information, and outputs the generated display information to the display unit 101. As a result, each display unit 101 displays the content. Note that the display information may be input to each display unit 101 by other methods, and the input methods are not particularly limited. For example, a processing unit which generates display information based on information associated with a subspace managed by the unification coordinate space management unit 100 or subspace management unit 102, and arrangement information and the like output from the content arrangement unit 150, may be connected to implement the aforementioned display processing. Note that a content indicates general digital data including a wide variety of document (text), music, image, and video data.

The unification coordinate space management unit 100 includes, as its functional arrangement, a unification coordinate space information holding unit 110, unification coordinate space updating unit 111, arbitration unit 112, unification coordinate information acquisition unit 113, detection unit 114, and spatial information input unit 115. Note that FIG. 13 illustrates the functional arrangement in only the unification coordinate space management unit 100*a*. Of course, the unification coordinate space management units 100*b* and 100*c* include the same functional arrangements.

The unification coordinate space information holding unit 110 holds information associated with a unification coordinate space. The unification coordinate space updating unit 111 updates the information associated with the unification coordinate space held in the unification coordinate space information holding unit 110. The arbitration unit 112 arbitrates processes in the unification coordinate space management unit 100. This arbitration is implemented by locking and unlocking the processes in the unification coordinate space management unit 100.

The unification coordinate information acquisition unit 113 acquires information associated with a unification coordinate space managed by another unification coordinate space management unit 100 (for example, origin information and size information of a region managed on the unification coordinate space). The detection unit 114 detects another unification coordinate space management unit 100. The spatial information input unit 115 receives input spatial information.

The subspace management unit 102 includes, as its functional arrangement, a spatial information output unit 130, subspace information holding unit 131, subspace arrangement unit 132, and spatial information input unit 133. Note that FIG. 13 illustrates the functional arrangement in only the subspace management unit 102-1. Of course, the subspace management units 102-2, 102-3, and 102-4 also include the same functional arrangements.

The spatial information output unit 130 outputs information associated with a subspace managed by itself as spatial information. The subspace information holding unit 131 holds information associated with the subspace managed by itself. The spatial information input unit 133 receives spatial information input from the display unit 101. The subspace arrangement unit 132 arranges a space based on the spatial information input from the spatial information input unit 133, and generates a subspace. The arrangement in the display system has been explained. Note that the arrangement of the display system shown in FIG. 13 is merely an example, and the present invention is not limited to such specific arrangement.

An example of the operation in the display system shown in FIG. 13 will be described below with reference to FIGS. 14A to 17.

The sequence for arranging (adding) a subspace corresponding to a display region of the display unit 101 on the unification coordinate space will be explained first with reference to FIGS. 14A and 14B. In this case, the operation in the unification coordinate space management unit 100c when the unification coordinate space management unit 100c joins this display system while the unification coordinate space management units 100a and 100b have already arranged subspaces on the unification coordinate space will be described.

When this processing starts, the unification coordinate space management unit 100c executes initialization processing (S1301). In the initialization processing, information associated with the unification coordinate space held in the unification coordinate space information holding unit 110 is initialized. More specifically, the entire unification coordinate space is set as an unused region. Then, the unification coordinate space held by the unification coordinate space information holding unit 110 is set in a state 1404 shown in FIG. 15. Also, in the initialization processing, an arbitration retry count of arbitration processing by the arbitration unit 112 is set to be a prescribed value. The arbitration retry count is set to be a count value equal to or larger than 1. Note that every time the arbitration processing of the arbitration unit 112 is repeated, that value is decremented by "1". Furthermore, in the initialization processing, acceptance of a request for newly adding (or deleting) a region to (or from) the unification coordinate space is inhibited (locked). This is to maintain consistency upon adding or deleting a subspace to or from the unification coordinate space.

Figure 15:
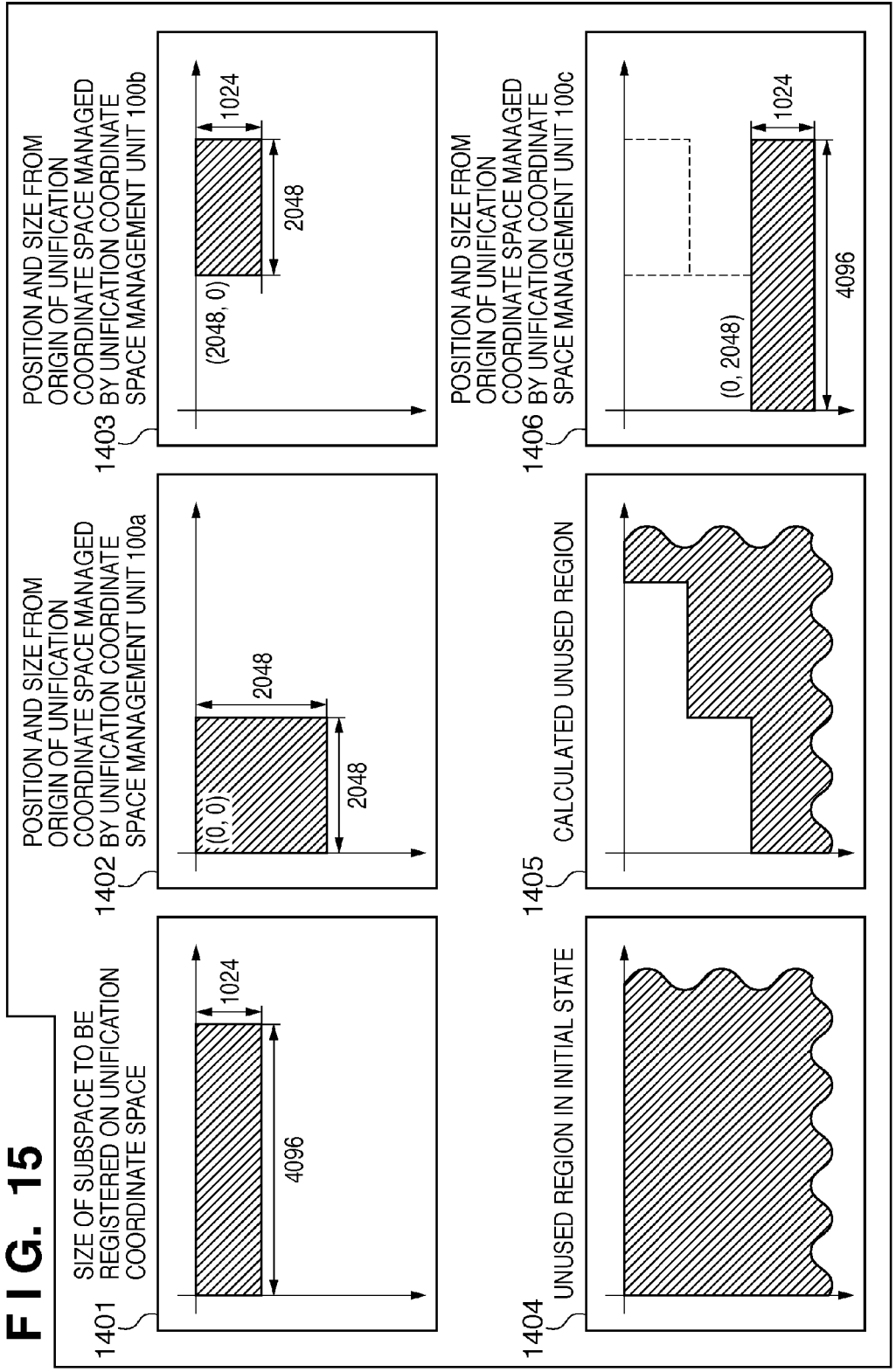
FIG. 15 is a view showing an example of transitions of regions on a unification coordinate space.

Upon completion of the initialization processing, the unification coordinate space management unit 100c calculates a size of a subspace registered on the unification coordinate space (S1302). In this processing, the spatial information input unit 115 receives input of size information of a subspace held by each subspace management unit 102. Then, a range, that is, a size of a subspace to be registered on the unification coordinate space is calculated based on the input information. With this processing, the unification coordinate space held by the unification coordinate space information holding unit 110 is set in, for example, a state 1401 shown in FIG. 15. The state 1401 shown in FIG. 15 illustrates a case in which a subspace to be registered on the unification coordinate space has a range of 4096 (horizontal)×1024 (vertical).

Then, the unification coordinate space management unit 100c causes the detection unit 114 to detect another unification coordinate space management unit (S1303). As a result, if another unification coordinate space management unit 100 is not detected (NO in step S1304), the process jumps to step S1311. On the other hand, if another unification coordinate space management unit 100 is detected (YES in step S1304), the unification coordinate space management unit 100c causes the arbitration unit 112 to lock that unification coordinate space management unit 100 (S1305). With this lock processing, only one unit adds or delete a subspace to or from the unification coordinate space at the same time in the system, and the consistency of the unification coordinate space can be maintained. As a lock method, for example, Mutex (a kind of semaphore) may be used. In addition, for example, a method of locking the entire system at one time using only one specific token in the entire system (when the unit does not hold any token, it is set in a locked state) may be adopted. If the entire system can be locked at one time as in a case using the token, the arbitration processing in step S1305 can be omitted. Assume that the unification coordinate space management unit 100a is detected in the processes of steps S1304 and S1305.

The unification coordinate space management unit 100c determines whether or not the arbitration processing in step S1305 has succeeded. If the arbitration has failed (NO in step S1306), and if the locked unification coordinate space management unit 100 is found, the unification coordinate space management unit 100c unlocks that unification coordinate space management unit 100 (S1320). The unification coordinate space management unit 100c then determines if the arbitration retry count is "0". If the arbitration retry count is "0" (YES in step S1321), the unification coordinate space management unit 100c ends this processing (abnormal). If the arbitration retry count is larger than "0" (NO in step S1321), the unification coordinate space management unit 100c decrements the arbitration retry count by "1" (S1322), and the process then returns to step S1304.

If the arbitration has succeeded (YES in step S1306), the unification coordinate space management unit 100c causes the unification coordinate information acquisition unit 113 to acquire, from the unification coordinate space management unit 100 detected by the process in step S1304, region information located on the uniform coordinate space and managed by that management unit (S1307). That is, the unification coordinate space management unit 100c acquires, from the unification coordinate space management unit 100a, origin information and size information of a subspace on the unification coordinate space managed by that management unit.

The unification coordinate space management unit 100c causes the unification coordinate space updating unit 111 to update an unused region on the unification coordinate space held by the unification coordinate space information holding unit 110 (S1308). This update process is executed based on the origin information and size information acquired from another unification coordinate space management unit (in this case, the unification coordinate space management unit 100a) in the process in step S1307. Assuming that the origin position of the unification coordinate space managed by the unification coordinate space management unit 100a is (0, 0) and its size is (2048, 2048), the unused region on the unification coordinate space held by the unification coordinate space information holding unit 110 is updated to a state 1402 shown in FIG. 15.

The unification coordinate space management unit 100c causes the detection unit 114 to detect new another unification coordinate space management unit 100 (S1309). With this process, the unification coordinate space management unit 100 from which unification coordinate space information has not been acquired yet is detected. This process can be implemented using a method of holding all unification coordinate space management units in a list structure or a method of holding all unification coordinate space management units in a sequence.

As a result of detection, if another unification coordinate space management unit 100 is detected (YES in step S1310), the process returns to step S1305 again. For example, assuming that the unification coordinate space management unit 100b is detected by this detection process, the origin position of a unification coordinate space managed by this management unit is (2048, 0), and its size is (2048, 1024), the unused region on the unification coordinate space held by the unification coordinate space information holding unit 110 is updated to a state 1405 shown in FIG. 15.

On the other hand, if no unification coordinate space management unit 100 is detected in step S1310 (NO in step S1310), the unification coordinate space management unit 100 causes the unification coordinate space updating unit 111 to arrange a region managed by itself, that is, a subspace on the unification coordinate space (S1311). This subspace is arranged at a position other than regions managed by other unification coordinate space management units 100. In this manner, by arranging regions corresponding to a plurality of display units on the unification coordinate space, a multi-display using the plurality of display units can be attained. Note that the arrangement position can be other than regions managed by other unification coordinate space management units 100, and a subspace may be arranged, for example, adjacent to regions managed by other management units. In this manner, the subspace calculated in the process of step S1302 is arranged in the unused region on the unification coordinate space. For example, if the unused region has the state 1405 in FIG. 15, and the subspace to be registered has the size 1401 in FIG. 15, the subspace is arranged as shown in a state 1406 in FIG. 15. The unification coordinate space management unit 100c causes the unification coordinate space information holding unit 110 to hold the origin position and size of the arranged subspace as a region on the unification coordinate space managed by itself.

Finally, the unification coordinate space management unit 100 causes the arbitration unit 112 to execute unlock processing (S1312). As a result, the locked unification coordinate space management unit is unlocked. In this way, the addition processing of a subspace onto the unification coordinate space is completed.

Figure 16:
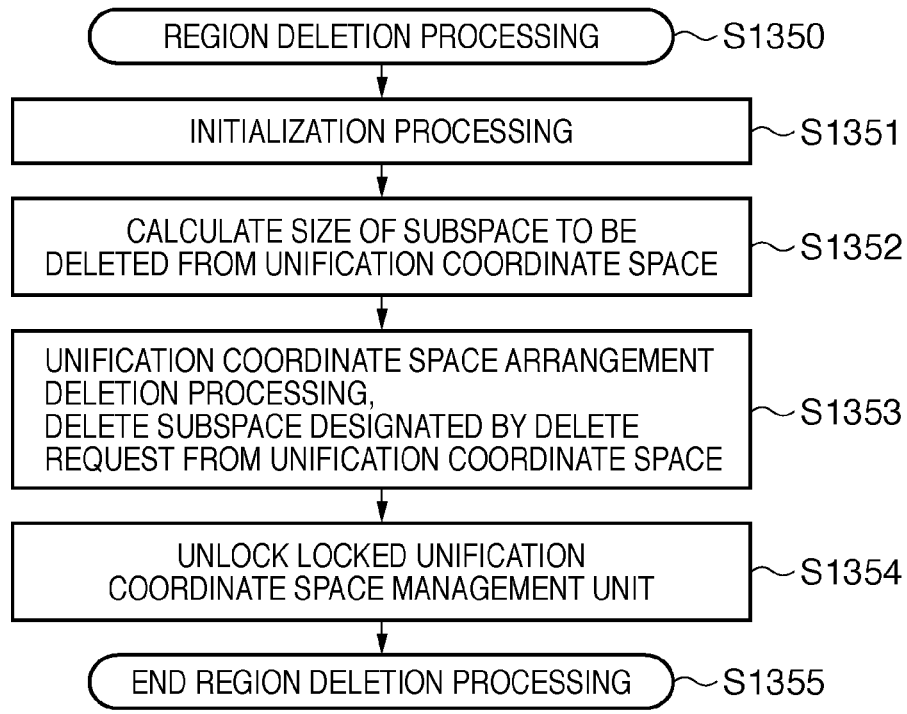
FIG. 16 is a second flowchart showing an example of the operation of the display system shown in FIG. 13.

The sequence for deleting a subspace corresponding to a display region of the display unit 101 from the unification coordinate space will be described below with reference to FIG. 16.

When this processing starts, the unification coordinate space management unit 100 executes initialization processing (S1351). In the initialization processing, acceptance of a request for newly adding (or deleting) a region to (or from) the unification coordinate space is inhibited (locked). This is to maintain consistency upon adding or deleting a subspace to or from the unification coordinate space.

Upon completion of the initialization processing, the unification coordinate space management unit 100 calculates a size of a subspace to be deleted from the unification coordinate space (S1352). In this process, the spatial information input unit 115 receives input of size information of a subspace held by each subspace management unit 102. Then, a range of a subspace to be deleted from the unification coordinate space, that is, a size is calculated based on the input information.

The unification coordinate space management unit 100 causes the unification coordinate space updating unit 111 to delete a region to be deleted from the unification coordinate space (S1353). That is, the origin information and size information of a subspace to be deleted from the unification coordinate space, which are held by the unification coordinate space information holding unit 110, are deleted. Finally, the unification coordinate space management unit 100 causes the arbitration unit 112 to execute unlock processing (S1354). Thus, the locked unification coordinate space management unit is unlocked.

Figure 17:
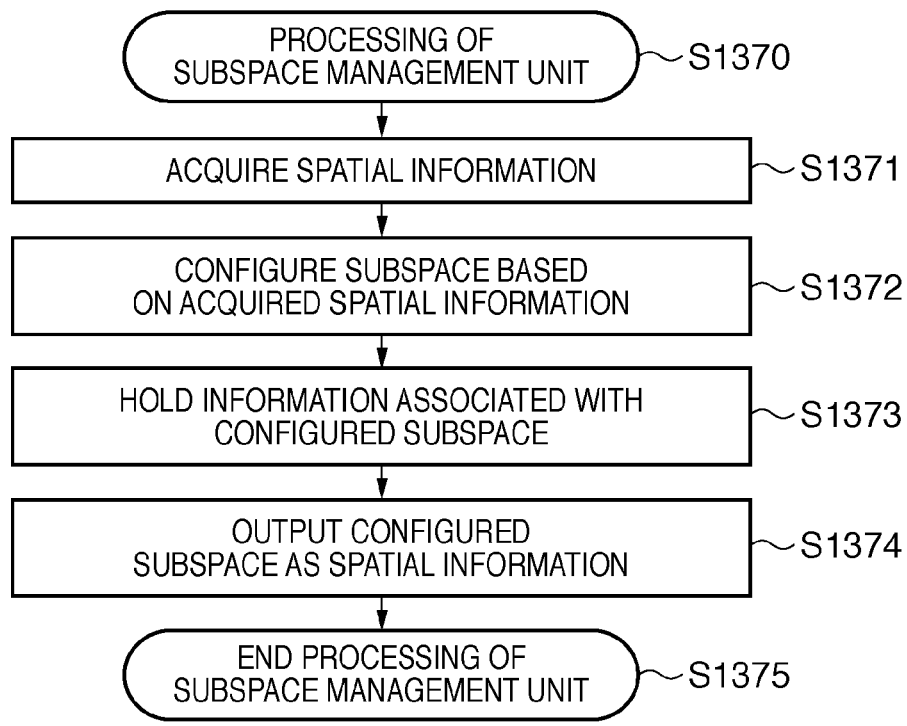
FIG. 17 is a third flowchart showing an example of the operation of the display system shown in FIG. 13.

An example of the operation in the subspace management unit 102 shown in FIG. 13 will be described below with reference to FIG. 17.

The subspace management unit 102 causes the spatial information input unit 133 to acquire a size of a display region from the display unit 101 connected to itself (S1371). The subspace management unit 102 causes the subspace arrangement unit 132 to arrange a region corresponding to the acquired size of the display region in a subspace managed by itself (S1372). Upon completion of this arrangement, the subspace management unit 102 causes the subspace information holding unit 131 to hold that arrangement information (S1373), and causes the spatial information output unit 130 to output spatial information (S1374). The output destination of the spatial information is, for example, the unification coordinate space management unit 100 connected on the upper order side.

The operation in the display system shown in FIG. 13 has been described. In the above description, the processing for changing the arrangement of a subspace in the unification coordinate space management unit 100 has not been described. However, since this processing can be implemented by successively executing deletion (see FIG. 16) and arrangement (see FIGS. 14A and 14B), a description thereof will not be given.

As described above, according to the second embodiment, display regions corresponding to a plurality of display devices are managed on the unification coordinate space, which is decentrally managed by the plurality of unification coordinate space management units 100 (e.g., hosts). In this way, the scalability for the number of display devices connected to the member terminals can be enhanced.

Third Embodiment

Figure 18:
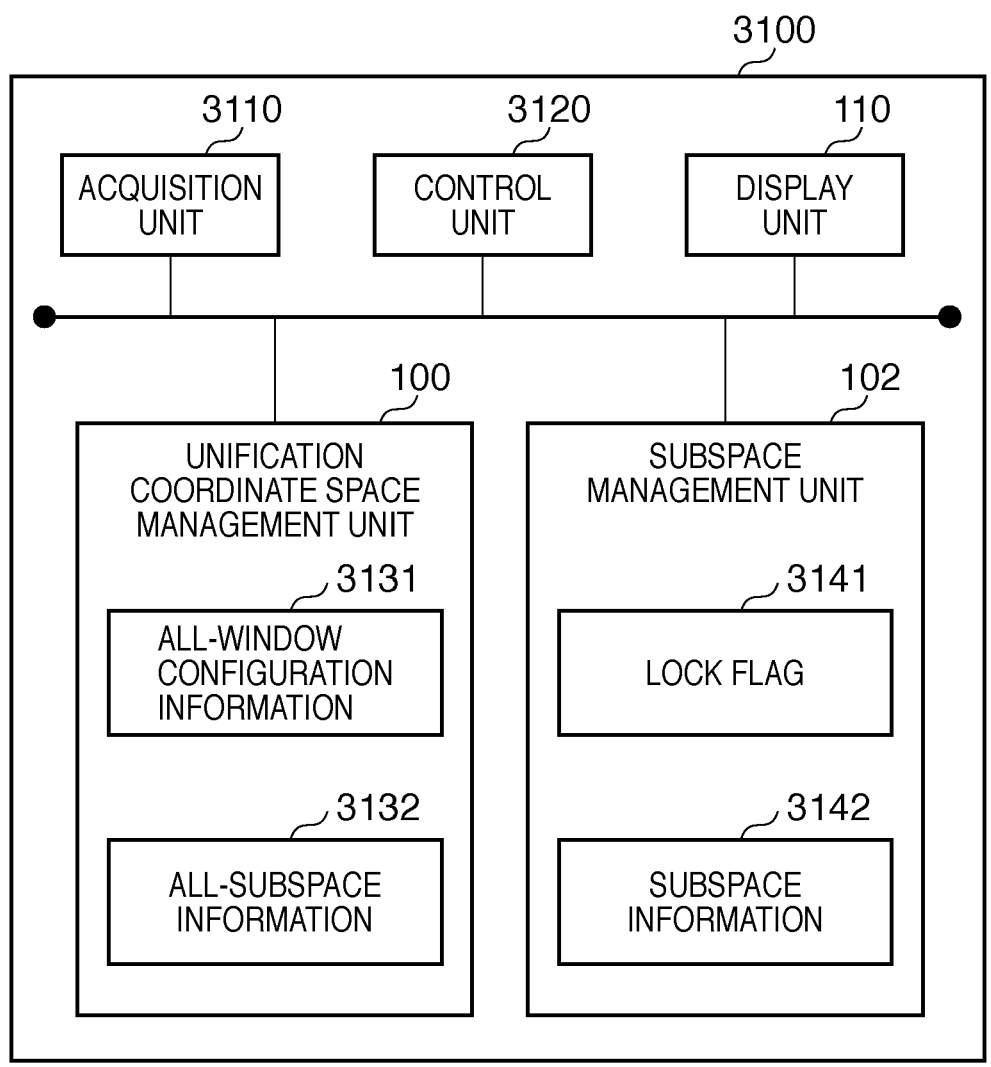
FIG. 18 is a block diagram showing an example of the functional arrangement of an information processing apparatus 3100 according to the third embodiment.

FIG. 18 is a block diagram showing an example of the functional arrangement of an information processing apparatus 3100 included in a display system according to the third embodiment. Note that the same reference numerals denote processing units which serve as the same functions as those in FIG. 1 used to explain the first embodiment, and a description thereof will often not be given.

An acquisition unit 3110 acquires a window display request from a participant of a video conference as the user of the information processing apparatus 3100. The display request includes at least any of a display size, display position, and display contents of the window. Information associated with the display size, display position, and display contents of the window will be referred to as window display information hereinafter. Also, information associated with the display size and display position of the window will be referred to as window configuration information hereinafter. Furthermore, an information processing apparatus 3100 other than the information processing apparatus which acquired the display request will be referred to as another information processing apparatus hereinafter. The window display information may be explicitly designated by the user or may be designated by an application or the like. The display request is issued when a new window is to be displayed, when the display position and display size of an existing window are to be changed, or when the display contents are to be updated.

A control unit 3120 controls the information processing apparatus 3100. For example, the control unit 3120 determines a display region of a window designated by the display request, and updates information held by a unification coordinate space management unit and subspace management unit. The display region represents a range defined by the display position and display size.

A unification coordinate space management unit 100 manages information associated with a unification coordinate space. The unification coordinate space represents a coordinate system shared by a plurality of information processing apparatuses 3100 connected to a display system (to be referred to as a video conference system hereinafter). All of the plurality of information processing apparatuses 3100 connected to the video conference system display windows based on common window display information. That is, when the information processing apparatus 3100 that acquired the display request displays a window, a window is displayed on other information processing apparatuses based on identical window display information.

The unification coordinate space management unit 100 manages all-window configuration information 3131 and all-subspace information 3132. The all-window configuration information 3131 represents window configuration information of all windows displayed in the unification coordinate space. This information includes information of windows of other information processing apparatuses. The all-subspace information 3132 is associated with pieces of subspace information 3142 in all the information processing apparatuses 3100. These pieces of information managed by the unification coordinate space management unit 100 are commonly held by all the information processing apparatuses 3100 connected to the video conference system. For this reason, when information managed by the unification coordinate space management unit 100 of one information processing apparatus has been updated, the control unit 3120 transmits the updated contents to all the information processing apparatuses. The control unit 3120 of the information processing apparatus, which received the update information, updates the information of the unification coordinate space management unit 100 of itself.

A subspace management unit 102 manages information associated with a subspace. The subspace indicates a region including a part or full of the unification coordinate space. The respective information processing apparatuses 3100 have different subspaces, which do not overlap each other. The information processing apparatus 3100 can display a window designated by the display request within only a range of the subspace possessed by itself. When the information processing apparatus cannot display a window designated by the display request in the subspace of itself, it displays the window by receiving assignment of a part of a subspace possessed by another information processing apparatus.

The subspace management unit 102 manages a lock flag 3141 and subspace information 3142. The lock flag 3141 represents whether or not a subspace possessed by itself is locked, and can assume one of attribute values "lock" and "unlock". Only the information processing apparatus 3100 which locks the subspace can change window configuration information in the target subspace, and other information processing apparatuses 3100 cannot execute change processing until the locked subspace is unlocked. The subspace information 3142 represents a range of the subspace possessed by itself. The subspace management unit 102 manages only the information associated with the subspace possessed by itself, but it does not manage information associated with subspaces possessed by other information processing apparatus.

A display unit 101 displays various windows. The windows to be displayed include a window designated by the display request and those received from other information processing apparatuses 3100. This display is made based on the window display information. Note that the unification coordinate space may be displayed on the entire display unit 101 or may be displayed on a partial region of the display unit 101. The information processing apparatus 3100 may include a plurality of display units 101.

Figure 19:
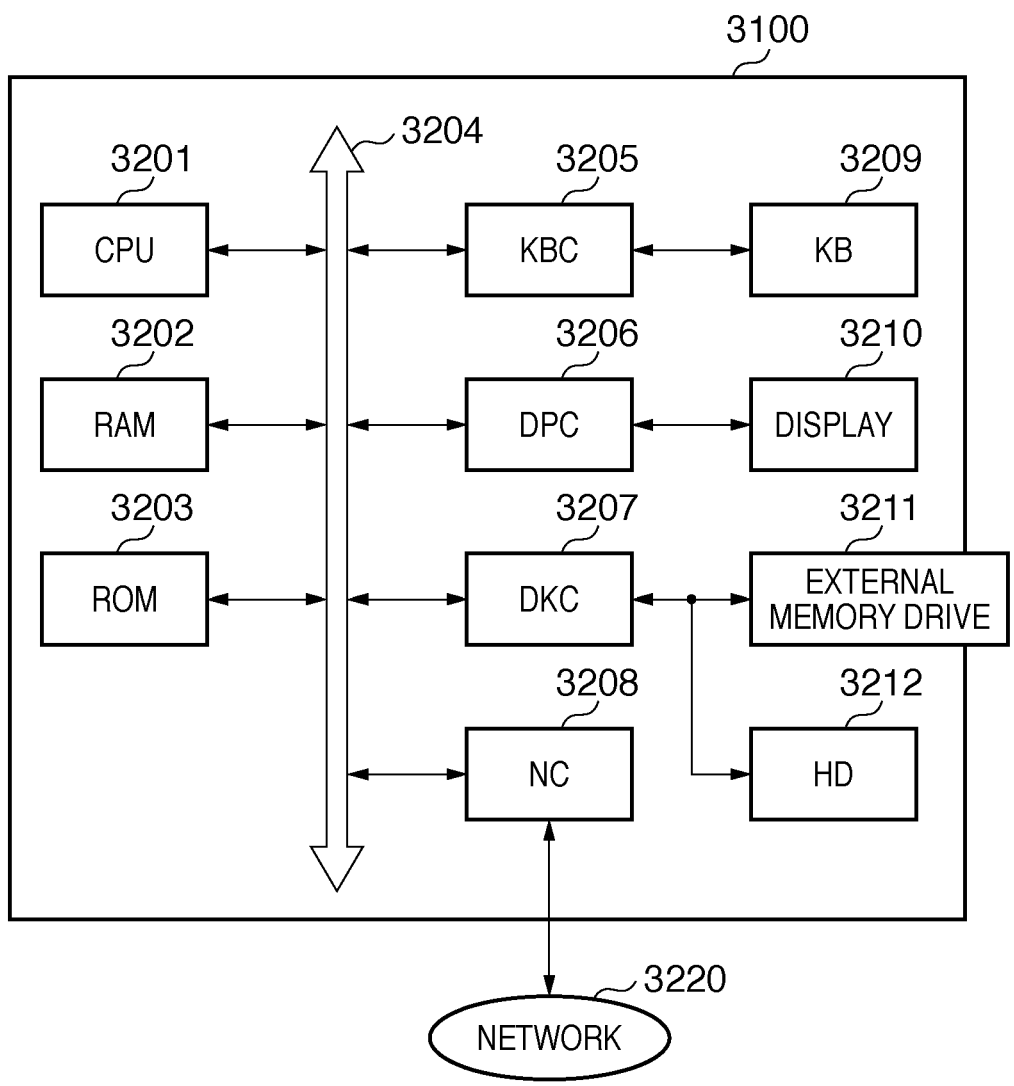
FIG. 19 is a block diagram showing an example of the hardware arrangement of the information processing apparatus 3100 according to the third embodiment.

FIG. 19 is a block diagram showing an example of the hardware arrangement of the information processing apparatus 3100 according to the third embodiment. Note that FIG. 19 shows a minimum required arrangement for the sake of simplicity.

A CPU 3201 as a microprocessor controls the information processing apparatus 3100 based on programs and data managed on a ROM 3203, hard disk (HD) 3212, and a management medium set in an external memory drive 3211. The CPU 3201 serves as the control unit 3120. A RAM 3202 serves as a work area of the CPU 3201, and holds programs stored in the ROM 3203, HD 3212, and the like. Also, the RAM 3202 stores information managed by the unification coordinate space management unit 100 and subspace management unit 102.

The ROM 3203, the management medium set in the external memory drive 3211, or the HD 3212 manages programs and the like to be executed by the CPU 3201, as shown in the flowcharts to be described later.

Reference numeral 3205 denotes a keyboard controller (KBC), which controls inputs from a keyboard (KB) 3209 and a pointing device such as a mouse (not shown). These devices serve as the acquisition unit 3110. Reference numeral 3206 denotes a display controller (DPC), which controls a display on a display 3210. The display 3210 serves as the display unit 101. Reference numeral 3207 denotes a disk controller (DKC), which controls accesses to the HD 3212 and external memory drive 3211 to read or write various programs and various data including font data, user files, and edit files from or to these management media. Reference numeral 3208 denotes a network controller (NC), which makes communications with a network 3220. The plurality of information processing apparatuses 3100 exchange window display information and the like with each other using their network controllers 3208.

Note that the CPU 3201 executes outline font rasterize processing onto a display information area assured on, for example, the RAM 3202 or a dedicated video memory (VRAM) to allow the display on the display 3210. The CPU 3201 opens various registered windows based on commands designated by a mouse cursor or the like on the display 3210 and executes various kinds of data processing.

An overview of the operation of the information processing apparatus 3100 according to the third embodiment will be described below with reference to FIGS. 20 to 24. Upon acquisition of a display request which requests to change only the display contents of a window, the display unit 101 displays the changed display contents. The control unit 3120 transmits the display contents to other information processing apparatuses. At this time, the display units 101 of other information processing apparatuses display the changed display contents. A display request which requests to change window configuration information will be described below (for example, a description of the display request which requests to change only the display contents will not be given).

Figure 20:
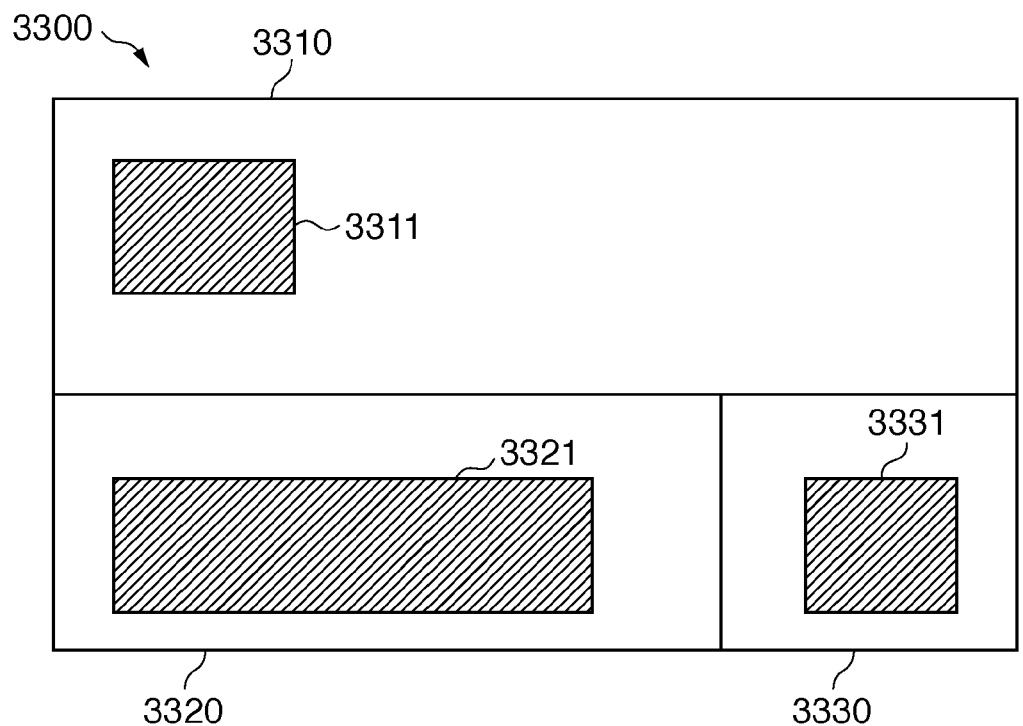
FIG. 20 is a view showing an example of a window display state of a video conference system.

FIG. 20 is a view showing an example of a window display state of the video conference system. To the video conference system, information processing apparatuses A, B, and C are connected. All the display units 101 of these information processing apparatuses 3100 display windows arranged on a unification coordinate space 3300. The unification coordinate space 3300 is divided into subspaces 3310, 3320, and 3330. These subspaces are respectively possessed by the information processing apparatuses A, B, and C. The information processing apparatus 3100 can display a window designated by a display request of the user of that information processing apparatus 3100 that acquired the display request only within the subspace possessed by itself. A window 3311 designated by a display request of the user of the information processing apparatus A is displayed within the subspace 3310. Also, windows 3321 and 3331 are respectively displayed within the subspaces 3320 and 3330.

Note that frame lines that represent the borders of the respective subspaces are described for the descriptive purpose, and they may not be displayed in practice. However, in order to make the user of each information processing apparatus 3100 recognize the range of the subspace possessed by itself, these border lines may be actually displayed.

Figure 21:
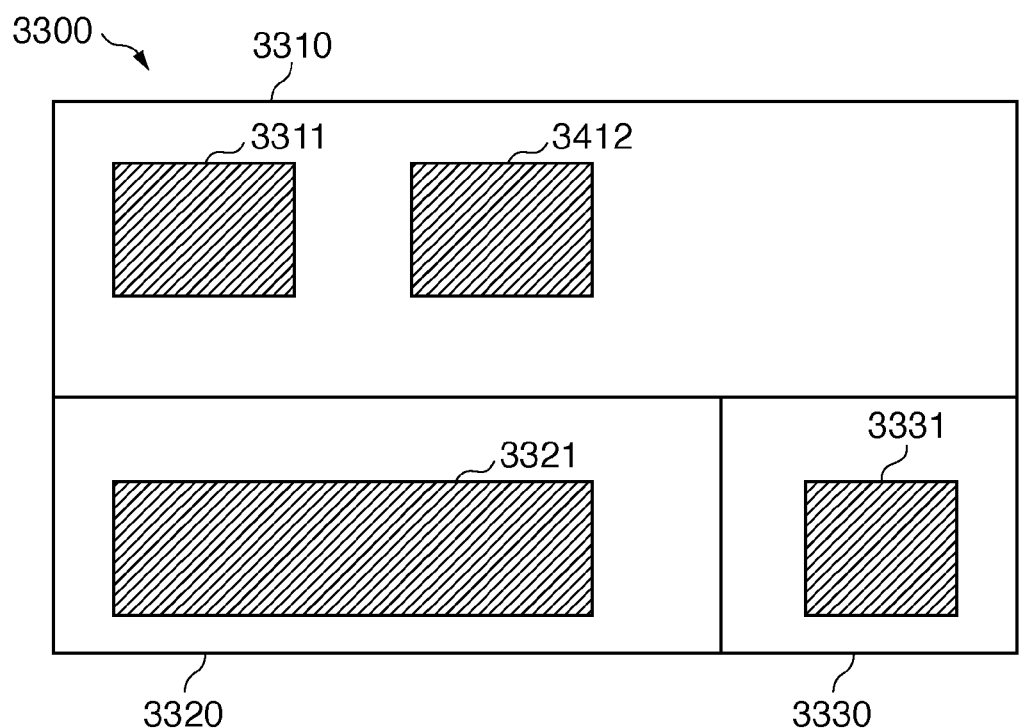
FIG. 21 is a view showing an example of the state of a unification coordinate space 3300 after a new window 3412 is displayed.

Assume that the user of the information processing apparatus A issues a display request of a new window in this state. Also, assume that the new window has the same display size as the window 3311, but its display position is not designated. In this case, the information processing apparatus A locks the subspace 3310 possessed by itself. Only the information processing apparatus 3100 which locks the subspace can change the window configuration information of the locked subspace. The information processing apparatus A determines whether or not the new window can be displayed in the subspace 3310 so as not to overlap the existing window 3311. Since the subspace 3310 includes a region that can display the new window, the information processing apparatus A displays the new window within the subspace 3310. As a result, the unification coordinate space 3300 is updated to a state shown in FIG. 21. FIG. 21 is a view showing an example of the state of the unification coordinate space 3300 after a new window 3412 is displayed. After the new window is displayed, the information processing apparatus A unlocks the subspace 3310.

As described above, when the new window can be displayed within the subspace 3310 possessed by itself, the information processing apparatus A never locks the subspaces possessed by other information processing apparatuses B and C. For this reason, the information processing apparatuses B and C can parallelly process other window display requests irrespective of the display processing of that new window. The information processing apparatus A can efficiently display the new window since it need not make any adjustment to, for example, lock the subspaces of other information processing apparatuses B and C.

Subsequently, assume that the user of the information processing apparatus C issues a display request of a new window from the state of the unification coordinate space 3300 shown in FIG. 21. Also, assume that the new window has the same display size as the window 3311 but its display position is not designated. In this case, the information processing apparatus C locks the subspace 3330 possessed by itself. The information processing apparatus C then determines whether or not the new window can be displayed in the subspace 3330 so as not to overlap the existing window 3311.

Since the subspace 3330 does not include any region that can display the new window, the information processing apparatus C requests another information processing apparatus to assign a subspace, and notifies it of the size of the new window to be displayed. The information processing apparatus C requests the information processing apparatus A to assign a subspace. Note that the information processing apparatus as a request destination can be arbitrarily selected. Upon reception of the request, the information processing apparatus A locks the subspace 3310. With this locking, the information processing apparatus C can freely change the window configuration information in the subspace 3310 possessed by the information processing apparatus A without being disturbed by other information processing apparatuses including the information processing apparatus A. After locking, the information processing apparatus C requests the information processing apparatus A to assign a subspace, and notifies it of the size of the new window. Upon reception of the request, the information processing apparatus A determines whether or not the new window can be displayed within the subspace 3310 possessed by itself so as not to overlap the existing windows 3311 and 3412. Since the subspace 3310 includes a region that can display the new window, the information processing apparatus A assigns a part of the subspace 3310 of itself including that region. The information processing apparatus A notifies the information processing apparatus C of the position and size of the region to be assigned.

Figure 22:
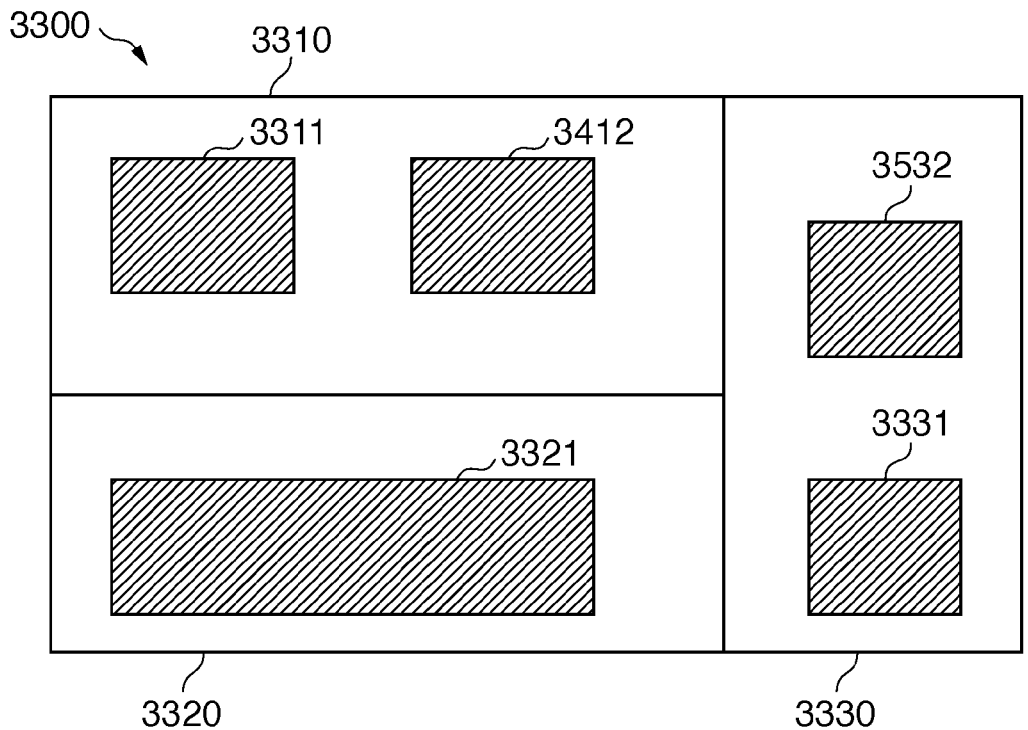
FIG. 22 is a view showing an example of the state of the unification coordinate space 3300 after a new window 3532 is displayed.

The information processing apparatus A excludes the assigned subspace from the subspace 3310 possessed by itself. On the other hand, the information processing apparatus C adds the assigned subspace to the subspace 3330 possessed by itself. The information processing apparatus C displays the new window using the assigned subspace. As a result, the unification coordinate space 3300 is updated to a state shown in FIG. 22. FIG. 22 is a view showing an example of the state of the unification coordinate space 3300 after a new window 3532 is displayed. After the new window 3532 is displayed, the information processing apparatus C unlocks the locked subspaces 3310 and 3330.

As described above, the information processing apparatus C does not lock the subspace 3320 possessed by the information processing apparatus B. For this reason, the information processing apparatus B can parallelly process another window display request independently of the display processing of the new window 3532. The information processing apparatus C can efficiently display the new window 3532 since it need not make adjustment to, for example, lock the subspace of the information processing apparatus B.

Note that the information processing apparatus A may assign only a minimum region required to display the new window 3532 or a region larger than that minimum region. In the example shown in FIG. 22, the subspace is assigned so that the subspace 3330 after assignment has a rectangular shape. However, the present invention is not limited to this, and a space having an arbitrary shape may be assigned. Also, the subspace possessed by one information processing apparatus 3100 may be separated into a plurality of regions. The size of a region to be assigned may be determined based on the size of a region where no window is displayed. Also, the size of a region to be assigned may be determined according to a user's situation of the information processing apparatus 3100 (for example, the user plans to open many windows).

Next, assume that the user of the information processing apparatus B issues a display request of a new window from the state of the unification coordinate space 3300 shown in FIG. 22. Also, assume that the new window has the same display size as the window 3321, but its display position is not designated. In this case, the information processing apparatus B locks the subspace 3320 possessed by itself. Then, the information processing apparatus B determines whether or not the new window can be displayed within the subspace 3320 so as not to overlap the existing window 3321.

Since the subspace 3320 does not include any region that can display the new window, the information processing apparatus B requests another information processing apparatus to assign a subspace. However, both the information processing apparatuses A and C cannot display the new window without overlapping the existing windows. Hence, the information processing apparatus B locks the subspaces possessed by all the information processing apparatuses. Then, the information processing apparatus B can freely change the window configuration information on the entire unification coordinate space 3300. After the subspaces are locked, the information processing apparatus B determines whether or not the unification coordinate space 3300 includes a region that can display the new window. Since the unification coordinate space 3300 includes a region that can display the new window, the information processing apparatus B requests the information processing apparatus which possesses the subspace including that region to assign the subspace (that region). Upon reception of the request, the information processing apparatus assigns the subspace including the overlapping region to the information processing apparatus B. As described above, each information processing apparatus may assign only a minimum required region (requested region) or a region more than the minimum required region.

Each information processing apparatus which assigns the subspace excludes that space from the subspace possessed by itself. On the other hand, the information processing apparatus B adds the assigned subspace to the subspace 3320 possessed by itself. Then, the information processing apparatus B displays the new window using the assigned subspace.

Figure 23:
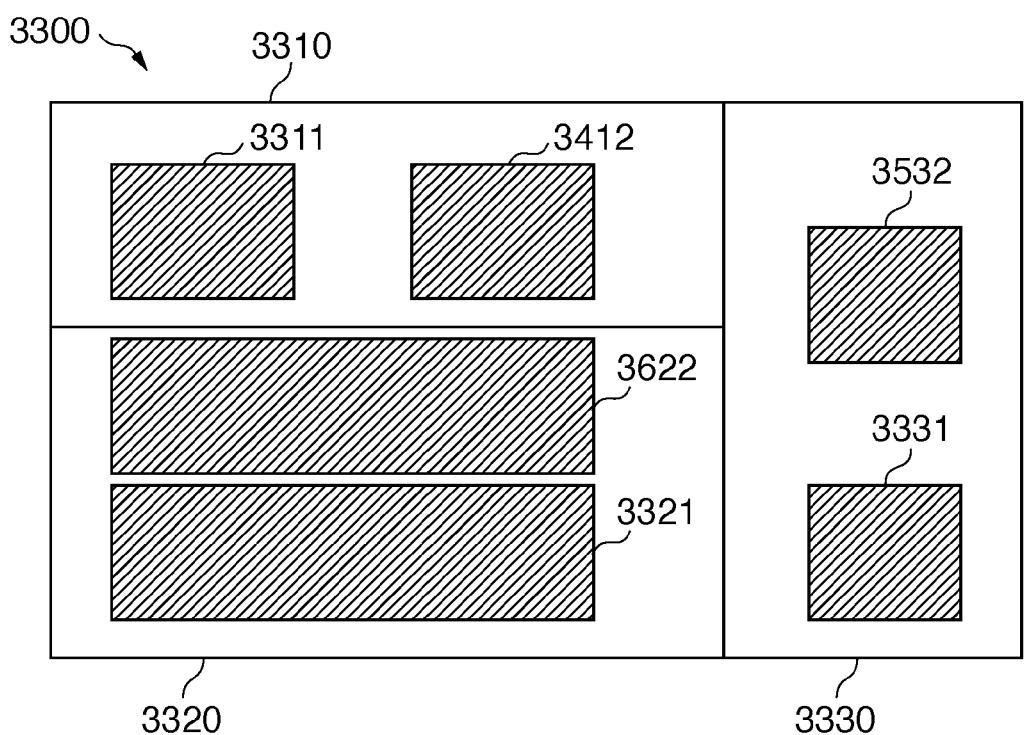
FIG. 23 is a view showing an example of the state of the unification coordinate space 3300 after a new window 3622 is displayed.

As a result, the unification coordinate space 3300 is updated to a state shown in FIG. 23. FIG. 23 is a view showing an example of the state of the unification coordinate space 3300 after a new window 3622 is displayed. After the new window 3622 is displayed, the information processing apparatus B unlocks all the subspaces.

During this processing, the entire unification coordinate space 3300 is locked. However, this processing is executed only when a new window cannot be displayed after the information processing apparatus 3100 requests each individual information processing apparatus 3100 to assign a subspace. For this reason, a new window can be efficiently displayed as a whole.

When the entire unification coordinate space does not include a free region, the new window is displayed to overlap the existing window or the display processing of the new window is canceled. When the new window is displayed to overlap the existing window, the same processing for displaying a new window after a subspace is assigned is also executed.

Also, in a stage upon determining a displayable range in the self subspace, overlapping with an existing window may be permitted. In this case, whether or not a new window can be displayed is determined by comparing the size of the subspace with that of the new window. As a result, the processing for requesting another information processing apparatus to assign a subspace can be reduced.

In the aforementioned example, a case has been explained wherein a new window is displayed. However, even when the display size of the existing window is changed, the same operation as described above can be executed. Furthermore, when the user designates the display position of a window, the window may be displayed irrespective of whether or not that position is included in the self subspace. In this case, the information processing apparatus requests the information processing apparatus 3100 having the subspace that overlaps the region to assign a subspace, and displays the window after the subspace is assigned.

Figure 24:
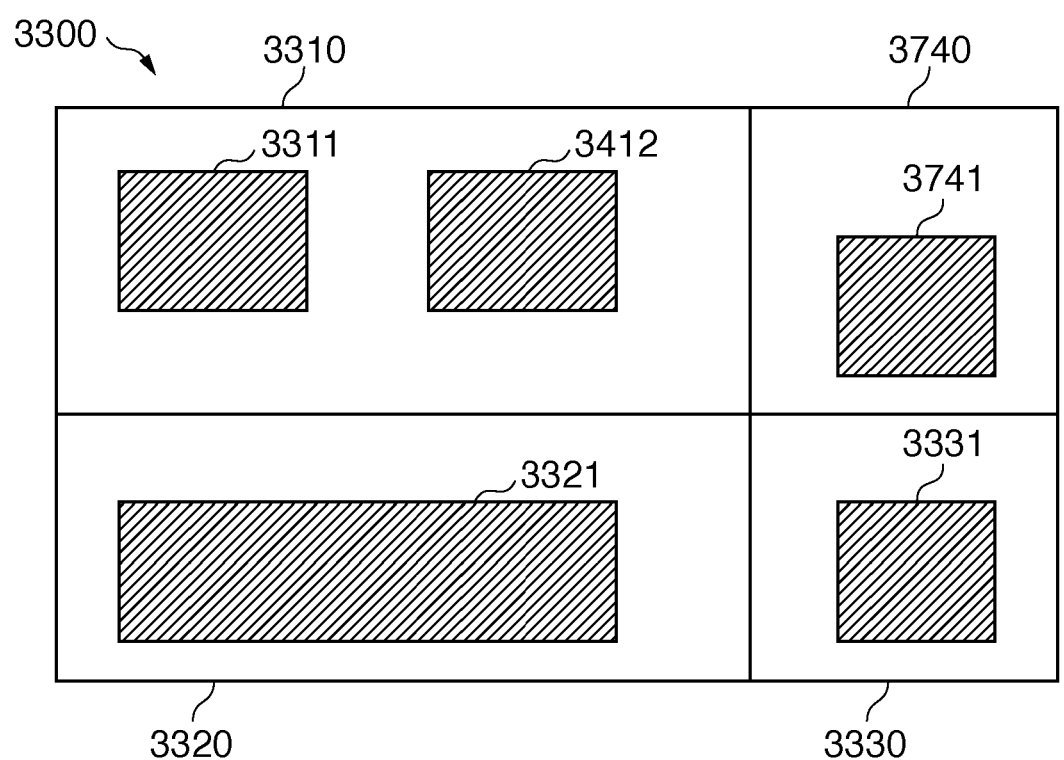
FIG. 24 is a view showing an example of the operation of the information processing apparatus upon acquiring a new subspace.

An information processing apparatus immediately after it joins the video conference does not possess any subspace. In this case, when the user of that information processing apparatus issues a display request of a new window, that information processing apparatus has to receive a subspace assigned from another information processing apparatus. For example, assume that a new information processing apparatus D which is connected to the video conference system shown in FIG. 21 displays a new window. In this case, the information processing apparatus D is assigned with the subspace 3310 possessed by the information processing apparatus A, and displays the new window. As a result, the unification coordinate space 3300 is updated to a state shown in FIG. 24. FIG. 24 is a view showing an example of the operation of the information processing apparatus which acquires a new subspace. The information processing apparatus D acquires a subspace 3740, and displays a new window 3741 within that subspace.

An example of the operation of the information processing apparatus 3100 according to the third embodiment will be described below with reference to FIGS. 25 and 26. The processes shown in FIGS. 25 and 26 are implemented when the CPU 3201 executes computer programs written in the ROM 3203.

FIG. 25 is a flowchart showing an example of the operation of the information processing apparatus when a display request is generated.

In step S801, the acquisition unit 3110 acquires a window display request. A window designated by the display request will be referred to as a request window hereinafter. The control unit 3120 confirms the attribute value of the lock flag 3141. If the attribute value of the lock flag 3141 is "lock", the control unit 3120 waits for processing until it is changed to "unlock". If the attribute value of the lock flag 3141 is "unlock", the control unit 3120 changes it to "lock", and continues the processing.

If no window is displayed on the unification coordinate space, none of the information processing apparatuses 3100 possess any subspace. In this case, the acquisition unit 3110 sets the entire region of the unification coordinate space as a self subspace in the subspace information 3142.

The control unit 3120 determines in step S802 if the acquired display request designates a display position. If the display request designates a display position (YES in step S802), the process advances to step S813. If the display request does not designate any display position (NO in step S802), the process advances to step S803.

The control unit 3120 determines in step S803 based on the all-window configuration information 3131 and subspace information 3142 whether or not the request window can be displayed within the subspace possessed by itself without overlapping an existing window. If the request window can be displayed (YES in step S803), the control unit 3120 determines the display position in step S812, and the process advances to step S811. If the request window cannot be displayed (NO in step S803), the process advances to step S804. When the information processing apparatus which acquired the display request does not possess any subspace, since it cannot display the request window within the self subspace, the process advances to step S804.

In step S804, the control unit 3120 selects one of other information processing apparatuses, requests that apparatus to assign a subspace that can display the request window, and notifies the apparatus of the display size of the request window. The control unit 3120 of the other information processing apparatus which received the assignment request confirms the attribute value of the self lock flag 3141. If the attribute value of the lock flag 3141 is "lock", the control unit 3120 waits for processing until it is changed to "unlock". If the attribute value of the lock flag 3141 is "unlock", the control unit 3120 changes it to "lock", and determines if the self subspace includes a range that can display the request window without overlapping the existing window. If the subspace includes a displayable region, the control unit 3120 notifies the request source apparatus of a region including that region by designating it, and assigns a subspace. When the subspace does not include any displayable region, the control unit 3120 notifies the request source apparatus of it.

The control unit 3120 determines in step S805 if the subspace is assigned. If the subspace is assigned (YES in step S805), the process jumps to step S810. If the control unit 3120 receives a non-displayable response (NO in step S805), the process advances to step S806.

In step S806, the control unit 3120 changes the lock flag 3141 of the other information processing apparatus locked in step S804 to "unlock". The other information processing apparatus whose subspace is unlocked can change window configuration information so as to display a window other than the request window.

The control unit 3120 determines in step S807 whether or not other information processing apparatuses to which no assignment request of a subspace is issued still remain. If such apparatuses still remain (YES in step S807), the process returns to step S804, and the control unit 3120 requests the other information processing apparatus to assign a subspace. If no such apparatus remains (NO in step S807), the process advances to step S808.

In step S808, the control unit 3120 changes the lock flags 3141 of all other information processing apparatuses to "lock". The same applies when the processing waits in case of "lock". The control unit 3120 searches for a region that can display the request window based on the all-window configuration information 3131 without overlapping the existing window displayed on the unification coordinate space. If such a region is found, the control unit 3120 determines that region to be the display position of the request window. If such region is not found, the control unit 3120 determines an arbitrary region that overlaps the existing window to be the display position of the request window. In place of displaying the request window to overlap the existing window, the control unit 3120 may display an error message for the user and may end the processing.

In step S809, the control unit 3120 requests the other information processing apparatus which possesses a subspace that overlaps the display region of the request window to assign a region including the overlapping subspace, and notifies it of the display size of the request window. The other information processing apparatus which received the assignment request notifies the information processing apparatus which acquired the display request of the region including the subspace that overlaps the display region of the request window, thereby assigning the region to that apparatus.

In step S810, the control unit 3120 of the information processing apparatus which acquired the display request updates the subspace information 3142 to add the assigned region to the subspace. The control unit 3120 of the other information processing apparatus which assigned the subspace updates the self subspace information 3142 to exclude the assigned region from the subspace. Each information processing apparatus 3100 which updated the subspace information 3142 updates the contents of the all-subspace information 3132.

In step S811, the display unit 101 displays the request window based on the display request. The request window is displayed within the subspace possessed by the information processing apparatus which acquired the display request. Furthermore, the control unit 3120 updates the all-window configuration information 3131 managed by itself. Finally, the control unit 3120 changes the lock flags 3141 of all the information processing apparatuses 3100 locked in the processes executed so far to "unlock".

On the other hand, if it is determined in step S802 that the acquired display request designates the display position, the process advances to step S813. In step S813, the control unit 3120 calculates a subspace which overlaps upon displaying the request window, based on the all-subspace information 3132. The control unit 3120 of the information processing apparatus 3100 which acquired the display request requests all other information processing apparatuses to lock their subspaces. The process then advances to step S809 to execute the same processes as described above.

FIG. 26 is a flowchart showing an example of the operation of the information processing apparatus when a subspace is released. When all windows designated by acquisition requests are closed on the information processing apparatus which acquired the display request, no window is displayed on the possessed subspace. In this case, the possessed subspace is released, and other information processing apparatuses can effectively use the released subspace.

In step S901, the control unit 3120 confirms the attribute value of the lock flag 3141. If the attribute value of the lock flag 3141 is "lock", the control unit 3120 waits for processing until it is changed to "unlock". If the attribute value of the lock flag 3141 is "unlock", the control unit 3120 changes it to "lock", and continues processing.

In step S902, the control unit 3120 selects one of other information processing apparatuses which possess subspaces. The control unit 3120 changes the lock flag 3141 of the selected information processing apparatus to "lock", notifies the selected apparatus of the entire region of the subspace possessed by itself, and assigns that region to the selected apparatus. If the other information processing apparatus which possesses a subspace is not found, the control unit 3120 merely abandons its subspace. In this case, no window is displayed on the unification coordinate space.

In step S903, the control unit 3120 of the information processing apparatus which acquired the display request updates the subspace information 3142 to a free region. The control unit 3120 of the other information processing apparatus assigned with the subspace updates the self subspace information 3142 to add the assigned region to its subspace. Each information processing apparatus 3100 which updated the subspace information 3142 updates the contents of the all-subspace information 3132.

In step S904, the control unit 3120 changes the lock flags 3141 of all the information processing apparatuses 3100 locked in the processes executed so far to "unlock".

As described above, when the information processing apparatus which acquired the display request can display a window within the subspace possessed by itself, it never locks other information processing apparatuses. For this reason, other information processing apparatuses can parallelly change window configuration information. Furthermore, the information processing apparatus which acquired the display request need not adjust the display positions of other information processing apparatuses.

Even when a window cannot be displayed within the subspace possessed by itself, since the information processing apparatus locks and adjusts each of other information processing apparatuses, the window configuration information can be efficiently changed.

As described above, according to the third embodiment, a display region of a window can be efficiently assured in the video conference system.

Typical embodiments of the present invention have been described above. However, the present invention is not limited to the aforementioned and illustrated embodiments, and can be properly modified without departing from the scope of the invention.

The present invention can adopt embodiments in the forms of, for example, a system, apparatus, method, program, and storage medium. The present invention may be applied to either a system constituted by a plurality of devices, or an apparatus consisting of a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-189039 filed on Jul. 22, 2008, 2008-189042 filed on Jul. 22, 2008 and filed on Jul. 29, 2008, which are hereby incorporated by reference herein in their entirety.

What is claimed is:

1. A display system comprising:
a plurality of space management units configured to manage a predetermined space region as a management space region, said plurality of space management units being hierarchically connected;
a content management unit configured to manage one or a plurality of contents; and
a plurality of display units configured to display various kinds of information on display regions,
each space management unit of said plurality of space management units comprising:
a first acquisition unit configured to acquire, when a display unit, which is one of said plurality of display units, is connected on a lower order side of the space management unit, information including a size of a display region of the display unit from the display unit as spatial information;
a second acquisition unit configured to acquire, when another space management unit, which is one of said plurality of space management units, is connected on the lower order side of the space management unit, information including a size of a management space region of said another space management unit from said another space management unit as spatial information;
an arrangement unit configured to arrange the spatial information acquired by one of said first acquisition unit and said second acquisition unit as a subspace in a management space region managed by the space management unit; and
an output unit configured to output information including a size of the management space region to another space management unit, which is one of said plurality of space management units, connected on an upper order side of the space management unit, and
said content management unit comprising:
a management space region acquisition unit configured to acquire a management space region from any of said plurality of space management units; and
a content arrangement unit configured to arrange a content in the management space region acquired by said management space region acquisition unit,
wherein each display unit of said plurality of display units displays a content arranged in a subspace corresponding to a display region for the each display unit in the management space region.

2. The system according to claim 1, wherein when the spatial information acquired by one of said first acquisition unit and said second acquisition unit has changed from previously acquired spatial information, said arrangement unit re-arranges one or a plurality of subspaces in the management space region managed by the space management unit.

3. The system according to claim 1, wherein the space management unit further comprises:
a detection unit configured to detect whether or not another space management unit is connected on the upper order side of the space management unit, and
said output unit outputs the spatial information when said detection unit detects another space management unit.

4. The system according to claim 1, wherein when said content arrangement unit changes a content arranged in the management space region or adds a content to the management space region, each of said plurality of display units displays the changed or added content.

5. A display method for a display system comprising a plurality of space management units configured to manage a predetermined space region as a management space region, the plurality of space management units being hierarchically connected, a content management unit configured to manage one or a plurality of contents, and a plurality of display units configured to display various kinds of information on display regions,
wherein each space management unit of the plurality of space management units executes processes including:
acquiring, when a display unit, which is one of said plurality of display units, is connected on a lower order side of the space management unit, information including a size of a display region of the display unit from the display unit as spatial information;
acquiring, when another space management unit, which is one of said plurality of space management units, is connected on the lower order side of the space management unit, information including a size of a management space region of said another space management unit from said another space management unit as spatial information;
arranging the spatial information acquired in one of (a) the process of acquiring the information including the size of the display region of the display unit and (b) the process of acquiring the information including the size of the management space region of the another space management unit, as a subspace in a management space region managed by the space management unit; and
outputting information including a size of the management space region to another space management unit, which is one of said plurality of space management units, connected on an upper order side of the space management unit,
the content management unit executes processes including:
acquiring a management space region from any of the plurality of space management units; and arranging a content in the management space region acquired in the acquiring the management space region, and each display unit of the plurality of display units displays a content arranged in a subspace corresponding to a display region for the each display unit in the management space region.

* * * * *